United States Patent
Wang et al.

(10) Patent No.: US 10,534,932 B2
(45) Date of Patent: Jan. 14, 2020

(54) ENABLING EXCHANGE OF LOCATION AND OTHER STATUS INFORMATION BETWEEN PROSE USERS

(71) Applicant: INTERDIGITAL PATENT HOLDINGS, INC., Wilmington, DE (US)

(72) Inventors: Guanzhou Wang, Brossard (CA); Loic Canonne-Velasquez, Verdun (CA); Saad Ahmad, Montreal (CA); Mahmoud Watfa, Saint Leonard (CA); Dimitrios Karampatsis, Ruislip (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 127 days.

(21) Appl. No.: 15/516,337

(22) PCT Filed: Oct. 2, 2015

(86) PCT No.: PCT/US2015/053755
§ 371 (c)(1),
(2) Date: Mar. 31, 2017

(87) PCT Pub. No.: WO2016/054526
PCT Pub. Date: Apr. 7, 2016

(65) Prior Publication Data
US 2017/0337394 A1    Nov. 23, 2017

Related U.S. Application Data

(60) Provisional application No. 62/059,085, filed on Oct. 2, 2014, provisional application No. 62/162,349, filed on May 15, 2015.

(51) Int. Cl.
*H04L 29/00*  (2006.01)
*G06F 21/62*  (2013.01)
(Continued)

(52) U.S. Cl.
CPC ...... *G06F 21/6245* (2013.01); *H04L 63/0428* (2013.01); *H04L 67/16* (2013.01);
(Continued)

(58) Field of Classification Search
CPC ... G06F 21/6245; H04W 8/005; H04W 12/08; H04W 4/02; H04W 84/042; H04W 4/029; H04L 63/0428; H04L 67/16; H04L 67/18
See application file for complete search history.

(56) References Cited

U.S. PATENT DOCUMENTS 5,745,850 A * 4/1998 Aldermeshian ......... H04M 3/54
455/417
6,618,593 B1 * 9/2003 Drutman ............ G08B 21/0222
455/456.3
(Continued)

FOREIGN PATENT DOCUMENTS

| JP | 2017-535109 A | 11/2017 |
|----|---------------|---------|
| WO | WO 2016/044448 | 3/2016 |

OTHER PUBLICATIONS

3GPP ETSI TS 23 303 V12.2.0 (Sep. 2014) "Proximity-based services (ProSe); Stage 2" 63 pages. Sep. 2014 (Year: 2014).*
(Continued)

*Primary Examiner* — Don G Zhao
(74) *Attorney, Agent, or Firm* — Condo Roccia Koptiw LLP

(57) ABSTRACT

Location and other status information may be communicated between Proximity Service (ProSe) users. A ProSe function may retrieve a ProSe WTRU's location data from SLP and provide it to a monitoring WTRU via a ProSe discovery procedure or EPC-level ProSe discovery procedure. A ProSe function may retrieve a ProSe WTRU's location data from a ProSe WTRU and provide it to monitoring WTRUs via a ProSe discovery procedure. A ProSe WTRU may broadcast its location and/or other status information in a discovery
(Continued)

message. A ProSe function may encrypt the location and/or other status information for encryption before broadcast. A ProSe WTRU may send its location and/or other status information via a user plane to another ProSe WTRU or ProSe group. A ProSe function may verify whether a WTRU is permitted to disclose and/or process information (e.g., location information) and may indicate to a WTRU whether to disclose information, e.g., before the information is disclosed, and/or whether to process the information.

20 Claims, 23 Drawing Sheets

(51) Int. Cl.
| | |
|---|---|
| *H04W 4/029* | (2018.01) |
| *H04L 29/08* | (2006.01) |
| *H04L 29/06* | (2006.01) |
| *H04W 8/00* | (2009.01) |
| *H04W 12/08* | (2009.01) |
| *H04W 84/04* | (2009.01) |

(52) U.S. Cl.
CPC ............ *H04L 67/18* (2013.01); *H04W 4/029* (2018.02); *H04W 8/005* (2013.01); *H04W 12/08* (2013.01); *H04W 84/042* (2013.01)

(56) References Cited

U.S. PATENT DOCUMENTS

| | | | | | |
|---|---|---|---|---|---|
| 7,899,468 | B2* | 3/2011 | Lohtia | ................... | H04L 12/189 455/456.1 |
| 8,369,842 | B2* | 2/2013 | Proctor, Jr. | ........... | H04W 4/029 455/414.3 |
| 8,731,581 | B2* | 5/2014 | Blumberg | .............. | G01C 21/20 455/456.1 |
| 8,750,901 | B1* | 6/2014 | Gupta | ................ | G06Q 20/3223 455/456.1 |
| 8,756,641 | B2* | 6/2014 | Ivanov | ............... | H04N 21/4524 725/110 |
| 8,902,785 | B2* | 12/2014 | Xia | ........................ | H04W 72/04 370/252 |
| 9,654,900 | B2* | 5/2017 | Seed | ........................ | H04W 4/70 |
| 9,720,555 | B2* | 8/2017 | Sorden | ..................... | G06F 3/048 |
| 2003/0013449 | A1* | 1/2003 | Hose | ........................ | G08G 1/207 455/440 |
| 2007/0238455 | A1* | 10/2007 | Zhu | ........................ | H04W 4/02 455/422.1 |
| 2007/0270159 | A1* | 11/2007 | Lohtia | ................... | H04L 12/189 455/456.1 |
| 2009/0143056 | A1* | 6/2009 | Tang | ................... | H04M 1/7253 455/418 |
| 2010/0004004 | A1* | 1/2010 | Browne-Swinburne | ..................... | H04W 4/02 455/457 |
| 2010/0217660 | A1* | 8/2010 | Biswas | ................... | G06Q 30/02 705/14.38 |
| 2010/0325194 | A1 | 12/2010 | Williamson et al. | | |
| 2011/0026435 | A1* | 2/2011 | Weniger | ............... | H04W 8/065 370/254 |
| 2011/0165888 | A1* | 7/2011 | Shuman | ............ | G06F 17/30041 455/456.1 |
| 2011/0300802 | A1* | 12/2011 | Proctor, Jr. | ........... | H04W 4/029 455/41.2 |
| 2012/0106738 | A1* | 5/2012 | Belenkiy | ............... | H04L 9/0872 380/270 |
| 2012/0149369 | A1* | 6/2012 | Lamba | .................... | H04W 4/02 455/433 |
| 2012/0302259 | A1* | 11/2012 | Busch | ................... | H04W 4/029 455/456.3 |
| 2013/0091452 | A1* | 4/2013 | Sorden | ..................... | G06F 3/048 715/771 |
| 2014/0235238 | A1* | 8/2014 | Pais | ....................... | H04W 8/005 455/434 |
| 2015/0141001 | A1* | 5/2015 | Neubacher | ........ | H04W 52/0219 455/426.1 |
| 2016/0088446 | A1* | 3/2016 | Stephens | ................. | H04W 4/06 370/312 |

OTHER PUBLICATIONS

Selvanesan et al., "Towards Advanced V2X Multimedia Services for 5G Networks," 2018 IEEE. 2018, pp. 1-6. (Year: 2018).*

3rd Generation Partnership Project (3GPP), S2-151799, "Authorization for Broadcasting and Use of Location Information Over PC5 for Restricted Discovery", InterDigital, SA WG2 Meeting #109, Fukuoka, Japan, May 25-29, 2015, pp. 1-7.

3rd Generation Partnership Project (3GPP), TS 23.271 V11.3.0, "Technical Specification Group Services and System Aspects, Functional Stage 2 Description of Location Services (LCS) (Release 11)", Jun. 2014, pp. 1-169.

3rd Generation Partnership Project (3GPP), TS 24.334 V1.0.0, "Technical Specification Group Core Network and Terminals, Proximity-Services (ProSe) User Equipment (UE) to Proximity-Services (ProSe) Function Protocol Aspects, Stage 3 (Release 12)", Jun. 2014, pp. 1-43.

3rd Generation Partnership Project (3GPP), TS 36.300 V12.0.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 12)", Dec. 2013, pp. 1-96.

3rd Generation Partnership Project (3GPP), TS 36.305 V12.1.0, "Stage 2 Functional Specification of User Equipment(UE) Positioning in E-UTRAN (Release 12)", Jun. 2014, pp. 1-59.

3rd Generation Partnership Project (3GPP), TS 36.321 V12.0.0, "Technical Specification Group Radio Access Network, Evolved Universal Terrestrial Radio Access (E-UTRA), Medium Access Control (MAC) Protocol Specification (Release 12)", Dec. 2013, pp. 1-57.

Oma, "Secure User Plane Location Architecture", Candidate Version 3.0, OMA-AD-SUPL-V3_0-20110920-C, Sep. 20, 2011, pp. 1-43.

Oma, "UserPlane Location Protocol", Candidate Version 2.0, OMA-TS-ULP-V2_0-20080627-C, Jun. 2008, 409 pages.

* cited by examiner

ENABLING EXCHANGE OF LOCATION AND OTHER STATUS INFORMATION BETWEEN PROSE USERS

CROSS-REFERENCE TO RELATED APPLICATIONS

This application is the National Stage entry under 35 U.S.C. § 371 of Patent Cooperation Treaty Application PCT/US2015/053755, filed Oct. 2, 2015, which claims the benefit of U.S. Provisional Patent Application 62/059,085, filed Oct. 2, 2014 and U.S. Provisional Patent Application 62/162,349, filed May 15, 2015.

BACKGROUND

Location services functions can be used by wireless/transmit receive units (WTRUs) to obtain location information. For example, Location service (LCS) in Long Term Evolution (LTE) have been defined in order for a WTRU to use device-based and network-based methods for determining its location. However, exchange of the location information between different WTRUs presents numerous issues related to privacy, efficiency, and adaptability to various network conditions (e.g., in-coverage, out-of-coverage, different cells/locations, etc.)

SUMMARY

Location and other status information may be communicated between devices utilizing Proximity Service (ProSe) functions. A ProSe function or server, which may be located in a device or server within a core network or in communication with a core network, may retrieve a ProSe WTRU's location data from secure user plane location (SUPL) Location Platform (SLP) and provide it to a monitoring WTRU via a ProSe discovery procedure or Evolved Packet Core (EPC)-level ProSe discovery procedure. A ProSe function may retrieve a ProSe WTRU's location data from a ProSe WTRU and provide it to monitoring WTRUs via a ProSe discovery procedure. A ProSe WTRU may broadcast its location and/or other status information in a discovery message. A ProSe function may encrypt the location and/or other status information before broadcast. A ProSe WTRU may send its location and/or other status information via a user plane to another ProSe WTRU or ProSe group. A ProSe function may verify whether a WTRU is permitted to disclose and/or process information (e.g., location information) and may indicate to a WTRU whether to disclose information (e.g., before the information is disclosed) and/or whether to process the information.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
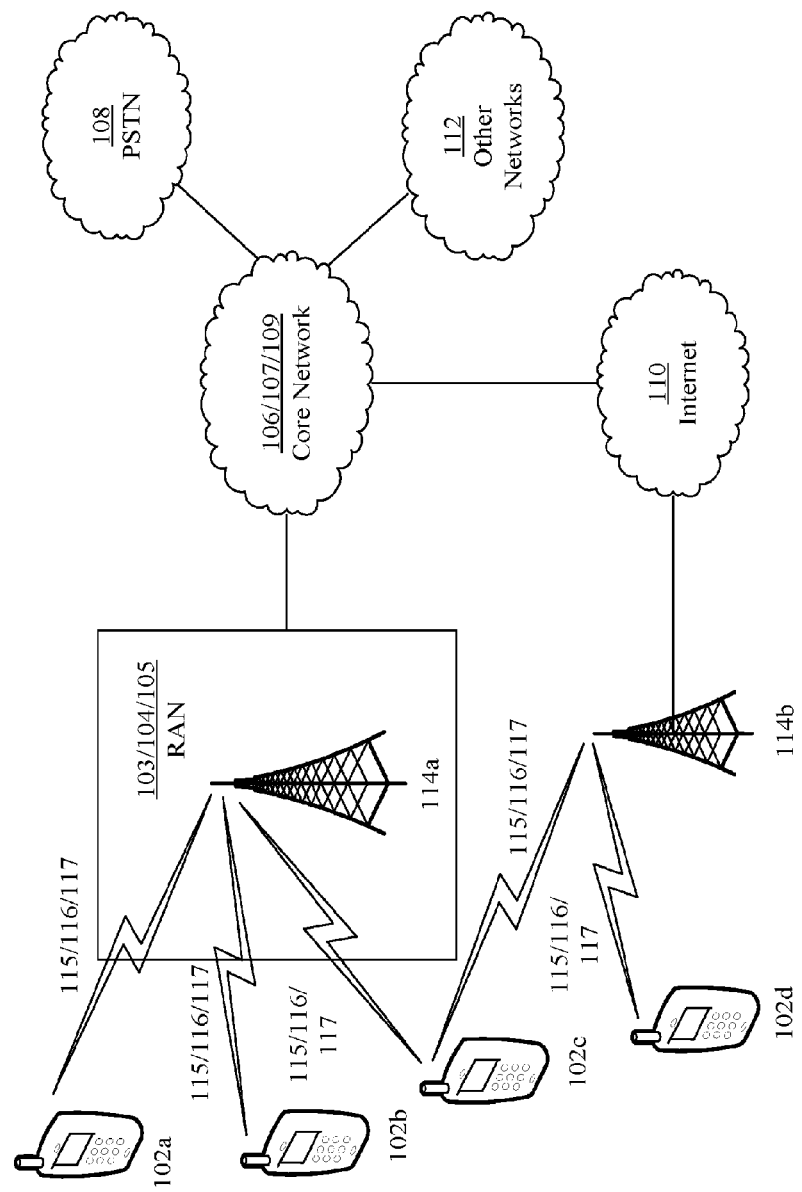
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
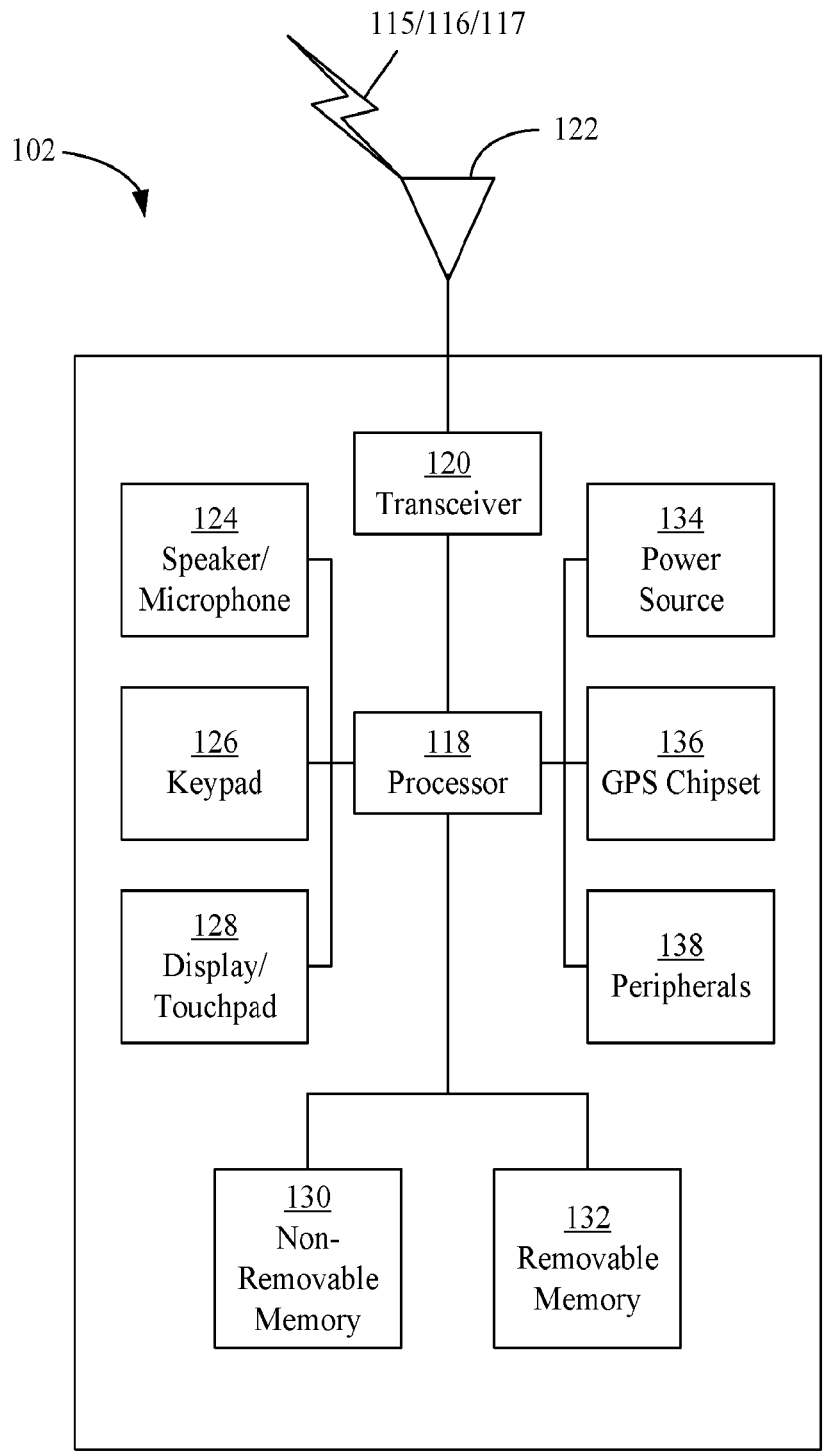
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
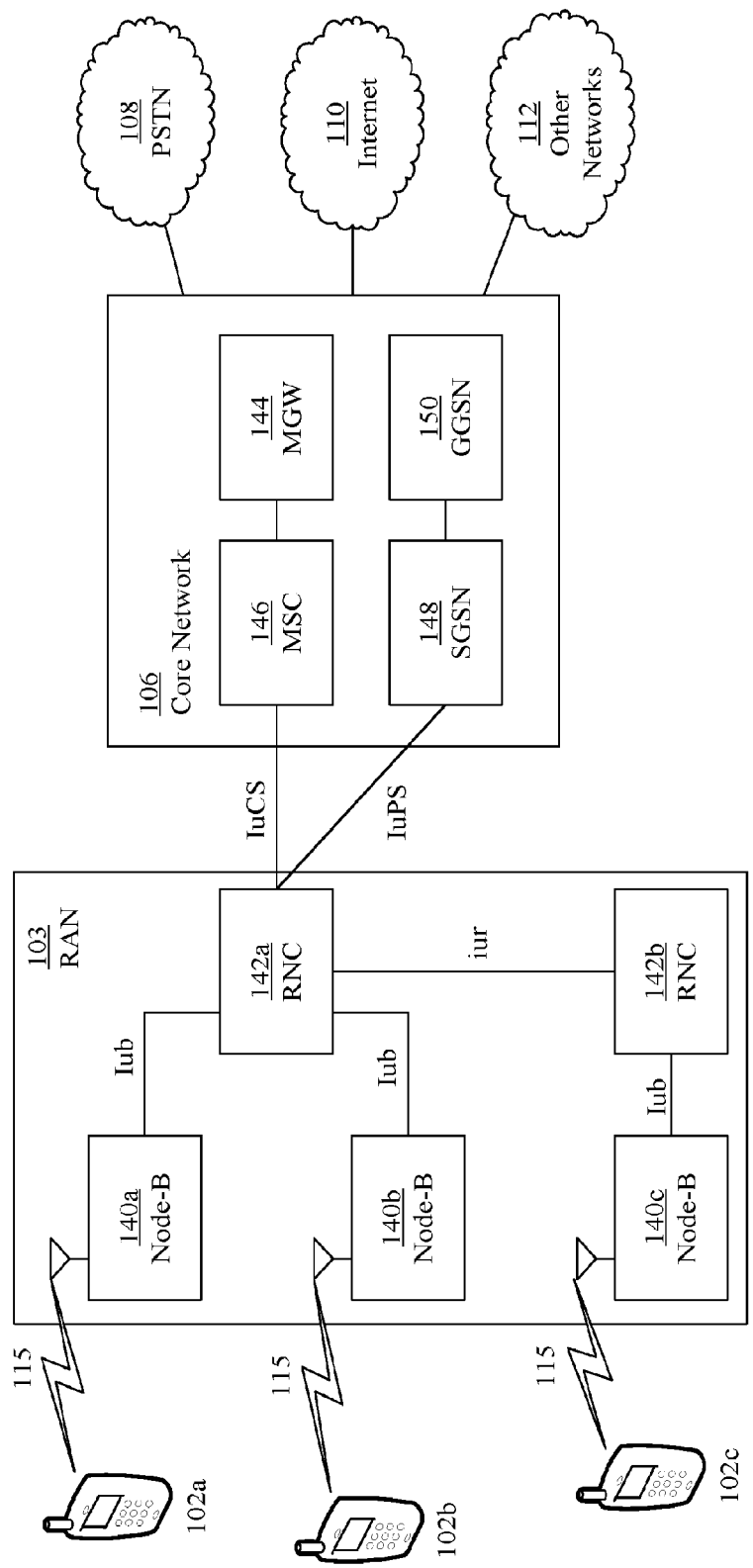
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
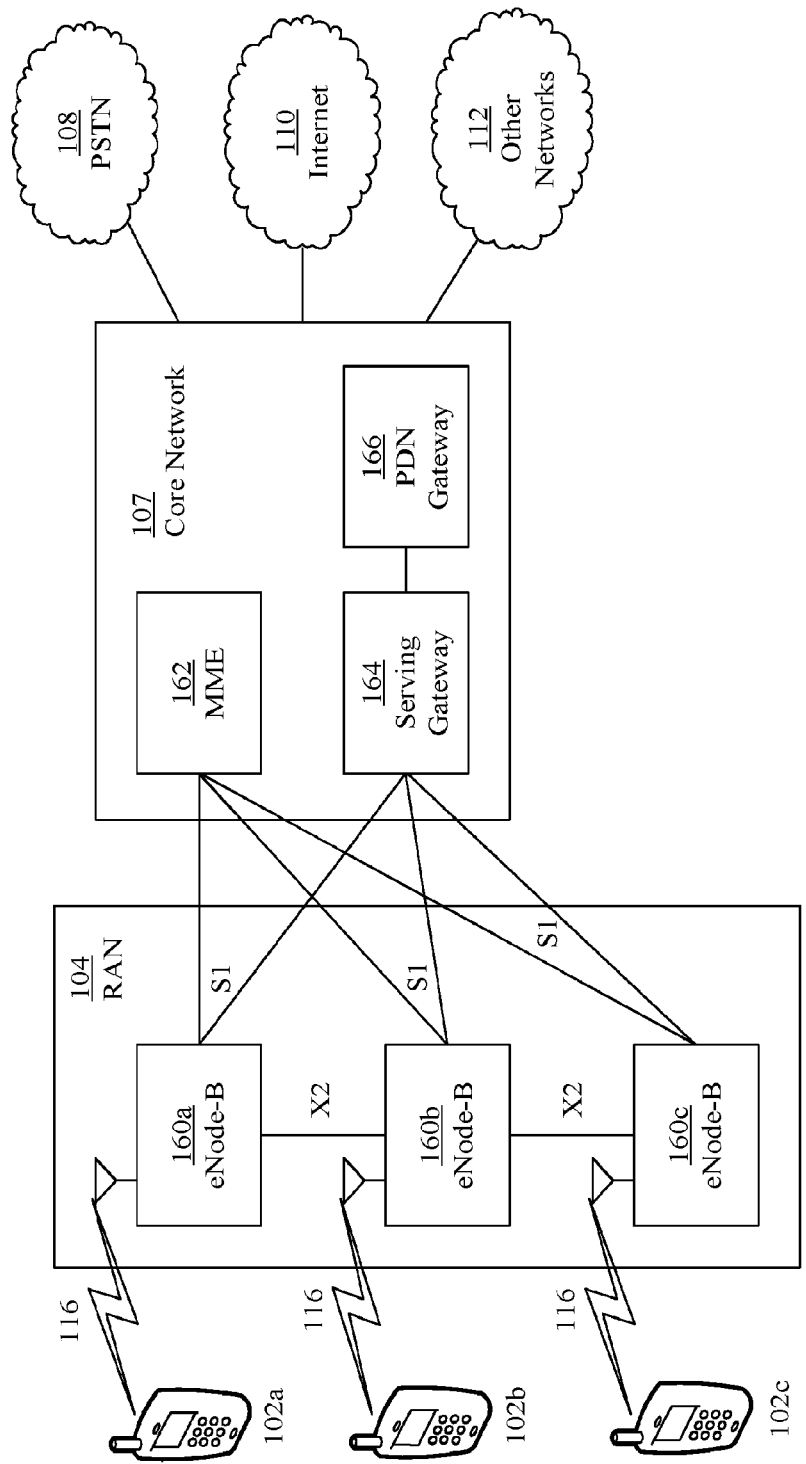
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
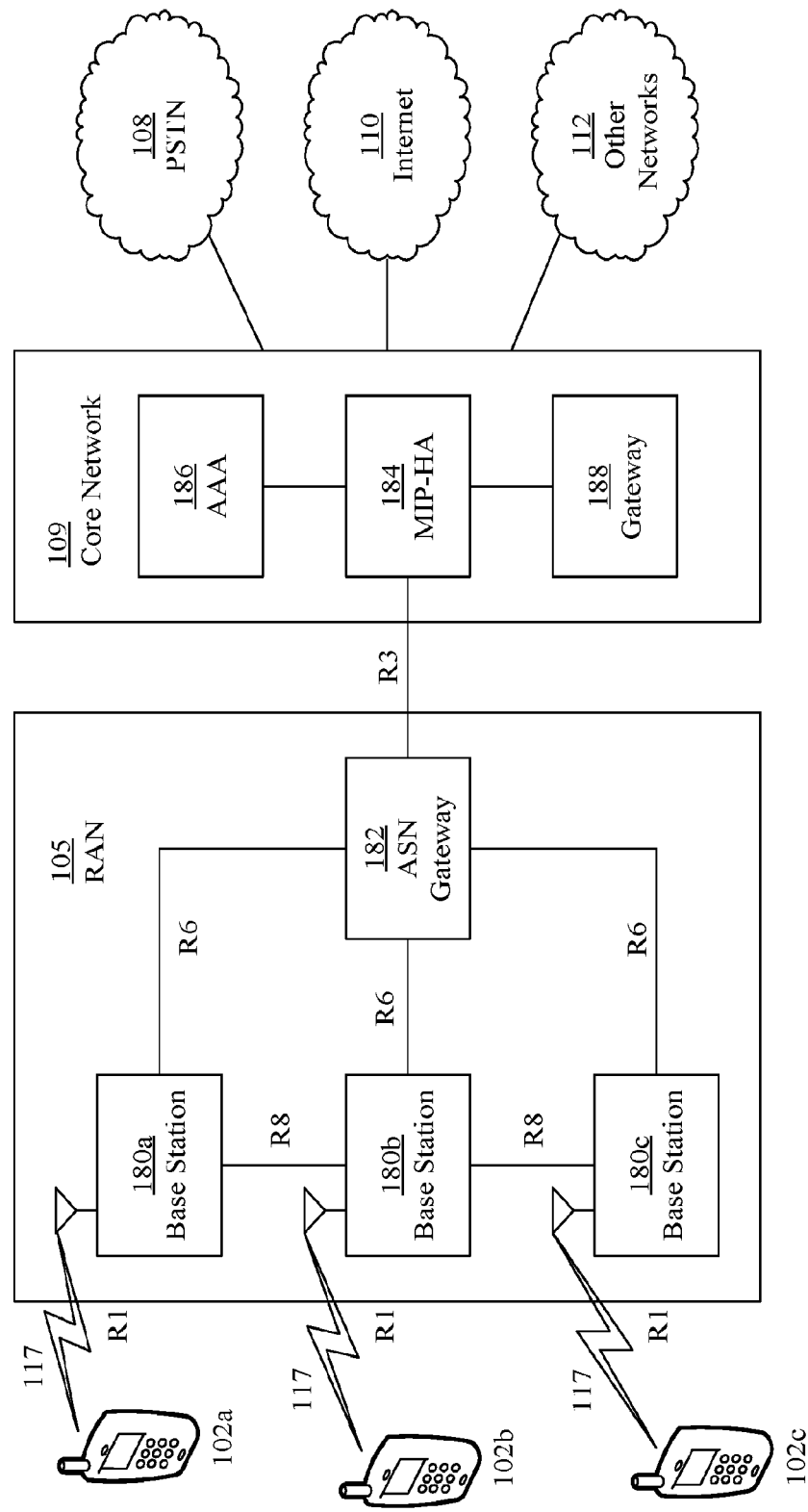
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities are disclosed for enabling exchange of location and other status information between Proximity Service (ProSe) devices. For example, a ProSe function may be an entity in a network, such as a server, the facilitates proximity services (e.g., discovery, association, data transfer, session management) between WTRUs. A ProSe function may be an independent network device and/or may be co-located within a core network node. A ProSe function may be located within a core network and/or may be outside a core network. A network entity within a core network may be referred to a Public Land Mobile Network (PLMN) node or device. The ProSe function may be located in a PLMN node or device.

A ProSe function may retrieve a ProSe WTRU's location data from SLP and provide it to a monitoring WTRU via a ProSe discovery procedure or EPC-level ProSe discovery procedure. A ProSe function may retrieve a ProSe WTRU's location data from a ProSe WTRU and provide it to monitoring WTRUs via a ProSe discovery procedure. A ProSe WTRU may broadcast its location and/or other status information in a discovery message. A ProSe function may encrypt the location and/or other status information for encryption before broadcast. A ProSe WTRU may send its location and/or other status information via a user plane to another ProSe WTRU or ProSe group. A ProSe function may verify whether a WTRU is permitted to disclose and/or process information (e.g., location information) and may indicate to a WTRU whether to disclose information, e.g., before the information is disclosed, and/or whether to process the information.

Figure 2:
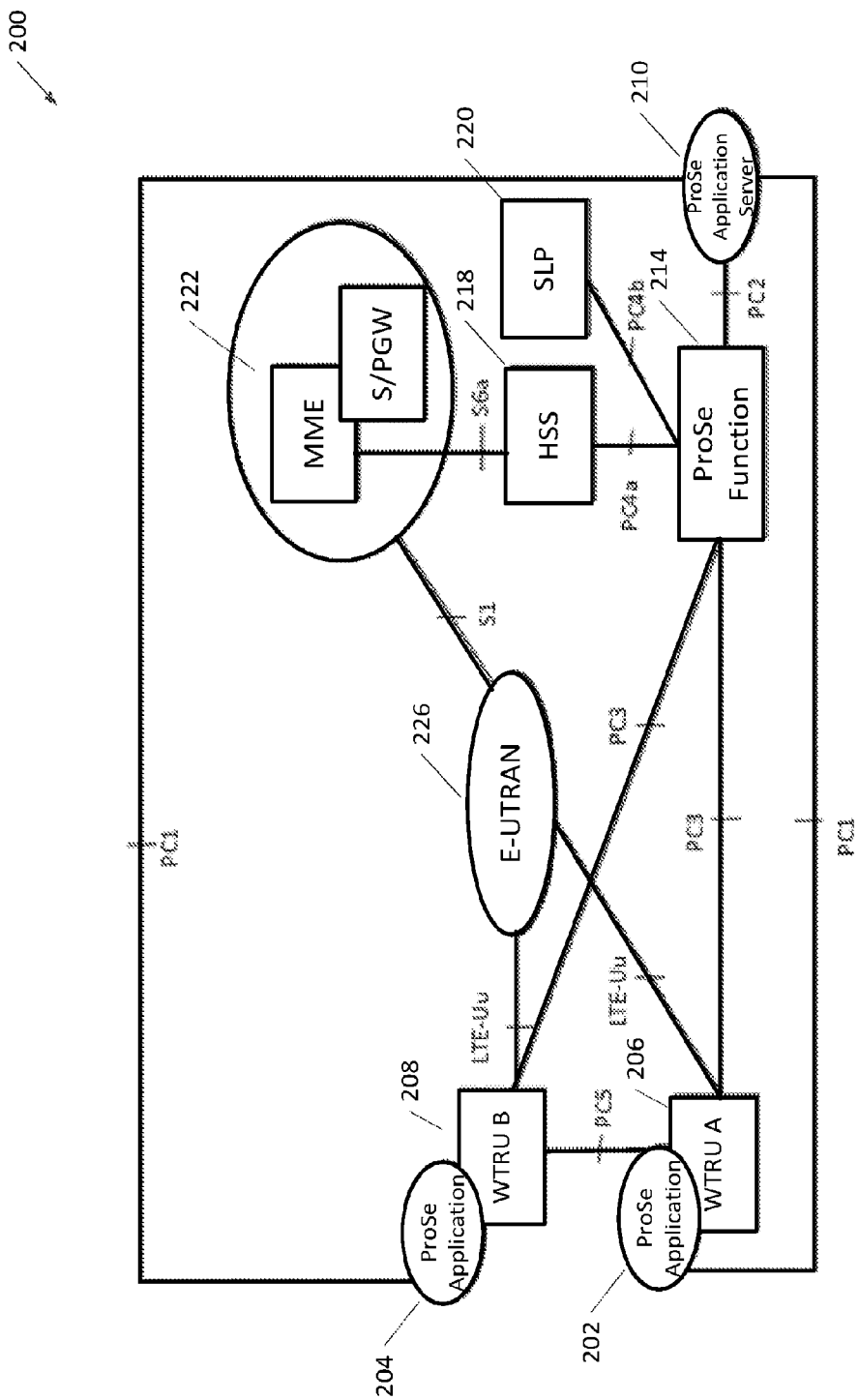
FIG. 2 is a diagram of an example of system architecture for a proximity service (ProSe).

FIG. 2 is a diagram of an example of a system architecture 200 for a proximity service (ProSe). Several reference points are indicated in the system shown in FIG. 2.

A PC1 reference point may exist between a ProSe application 202, 204 in a WTRU 206, 208 and a ProSe application server 210. The PC1 reference point may be used, for example, to define application level signaling requirements. For example, application layer signaling may be used for exchange of ProSe messages at the PC1 reference point.

A PC2 reference point may exist between the ProSe application server 210 and a ProSe function 214. The PC2 reference point may be used, for example, to define interaction between the ProSe application server 210 and ProSe functionality (e.g., name translation) provided by the 3GPP EPS via the ProSe function 214 for EPC-level ProSe discovery.

A PC3 reference point may exist between the WTRU 206 and the ProSe function 214 and/or between the WTRU 208 and the ProSe function 214. The PC3 reference point may use the EPC user plane for transport (e.g., as an "over IP" reference point). The PC3 reference point may be used to authorize ProSe direct discovery and EPC-level ProSe discovery requests. The PC3 reference point may be used to perform allocation of ProSe Application Codes corresponding to ProSe Application Identities used for ProSe direct discovery. The PC3 reference point may be used to define an authorization policy per Public Land Mobile Network (PLMN) for ProSe direct discovery (e.g., for Public Safety and non-Public Safety) and communication (e.g., for Public Safety only) between the WTRU 206, 208 and the ProSe function 214.

A PC4a reference point may exist between a Home Subscriber Server (HSS) 218 and the ProSe function 214. The PC4a reference point may be used to provide subscription information, for example, to authorize access for ProSe direct discovery and ProSe direct communication on a per PLMN basis. The PC4a reference point may also be used by the ProSe function 214 (e.g., EPC-level ProSe discovery Function) for retrieval of EPC-level ProSe discovery related subscriber data.

A PC4b reference point may exist between a SUPL Location Platform (SLP) 220 and the ProSe function. The PC4b reference point may be used by ProSe function (e.g., EPC-level ProSe discovery function), for example, in the role of LCS client to query the SLP.

A PC5 reference point may exist between WTRUs (e.g., between WTRU 206 and WTRU 208). The PC5 reference point may be used for control and user plane for ProSe direct discovery, ProSe direct communication, and/or ProSe WTRU-to-Network Relay.

A PC6 reference point may exist between ProSe functions in different PLMNs, e.g., between ProSe functions in a Home PLMN (HPLMN) and another PLMN, for example, when a WTRU is not roaming. The PC6 reference point may be used to authorize ProSe direct discovery requests. The PC6 reference point may be used to perform allocation of ProSe Application Identity Codes and ProSe Application Identity Names from an HPLMN. The PC6 reference point may be used for HPLMN control of ProSe service authorization.

A PC7 reference point may exist between ProSe functions in different PLMNs, e.g., between the ProSe function in the HPLMN and the ProSe function in the VPLMN or ProSe function in another PLMN, for example, when a WTRU is roaming. The PC7 reference point may be used to authorize ProSe direct discovery requests. The PC7 reference point may be used to perform allocation of ProSe Application Identity Codes and ProSe Application Identity Names from an HPLMN. The PC7 reference point may be used for HPLMN control of ProSe service authorization.

A S6a reference point may exist between the HSS 218 in a first PLMN and an MME 222, e.g., in a second PLMN. The S6a reference point may be used to download ProSe related subscription information to the MME 222 during an E-UTRAN attach procedure or to inform the MME 222 that subscription information in the HSS 218 has changed.

A S1 or S1-MME reference point may exist between MME 222 and E-UTRAN 226. The S1 or S1-MME reference point may be used to provide an indication to the eNB that the WTRU is authorized to use ProSe direct discovery.

ProSe function may be logical functionality that may be used for network related actions required for ProSe. ProSe function may play different roles for each feature of ProSe. ProSe function may include sub-functions that may perform different roles, for example, based on a ProSe feature.

Direct Provisioning Function (DPF) may be used to provision a WTRU with parameters in order to use ProSe direct discovery and ProSe direct communication. DPF may be used to provision WTRUs with PLMN-specific parameters, which may allow provisioned WTRUs to use ProSe in a specific PLMN. DPF may also be used to provision a WTRU with parameters when the WTRU is not served by E-UTRAN, for example, for direct communication used for Public Safety.

Direct Discovery Name Management Function (DDNMF) may be used for open ProSe direct discovery, for example, to allocate and process the mapping of ProSe Application IDs and ProSe Application Codes used in ProSe direct discovery. DDNMF may use ProSe related subscriber data stored in HSS for authorization for each discovery request. DDNMF may also provide a WTRU with security material, for example, to protect discovery messages transmitted over the air.

A ProSe function may provide charging functionality for usage of ProSe, e.g., for ProSe via the EPC, for ProSe direct discovery and for ProSe direct communication.

ProSe enabled WTRUs may engage in Direct Discovery procedures under various discovery models. In an example of a discovery model (e.g., Model A), discovery may be described, for example, as "I am here," e.g., a ProSe enabled WTRU may announce its presence to other devices. Roles may be defined for ProSe-enabled WTRUs participating in ProSe direct discovery. A first participating WTRU may have a role as an announcing WTRU. An announcing WTRU may announce certain information, which may be used by WTRUs in proximity to the announcing WTRU. Use of the information may be limited to WTRUs that have permission to discover. A second participating WTRU may have a role as a monitoring WTRU. A monitoring WTRU may, for example, monitor certain information of interest in proximity to one or more announcing WTRUs.

An announcing WTRU may broadcast discovery messages at pre-defined discovery intervals. A monitoring WTRU that may be interested in such broadcast discovery messages may receive, read, and process them.

Model A may be referred to as analogous to or equivalent to "I am here" given that an announcing WTRU may broadcast information about itself, such as its ProSe Application Identities or ProSe WTRU Identities, in a discovery message.

In another example of a discovery model (e.g., Model B), discovery may be described, for example, as "who is there?" or "are you there?" Roles may be defined for ProSe enabled WTRUs participating in ProSe direct discovery. A first participating WTRU may have a role as a discoverer WTRU. A discoverer WTRU may transmit certain information, such as a request that may include certain information about what it is interested to discover. A second participating WTRU may have a role as a discoveree WTRU. A discoveree WTRU may receive the request message and may, for example, respond with information related to the discoverer WTRU's request.

Figure 3:
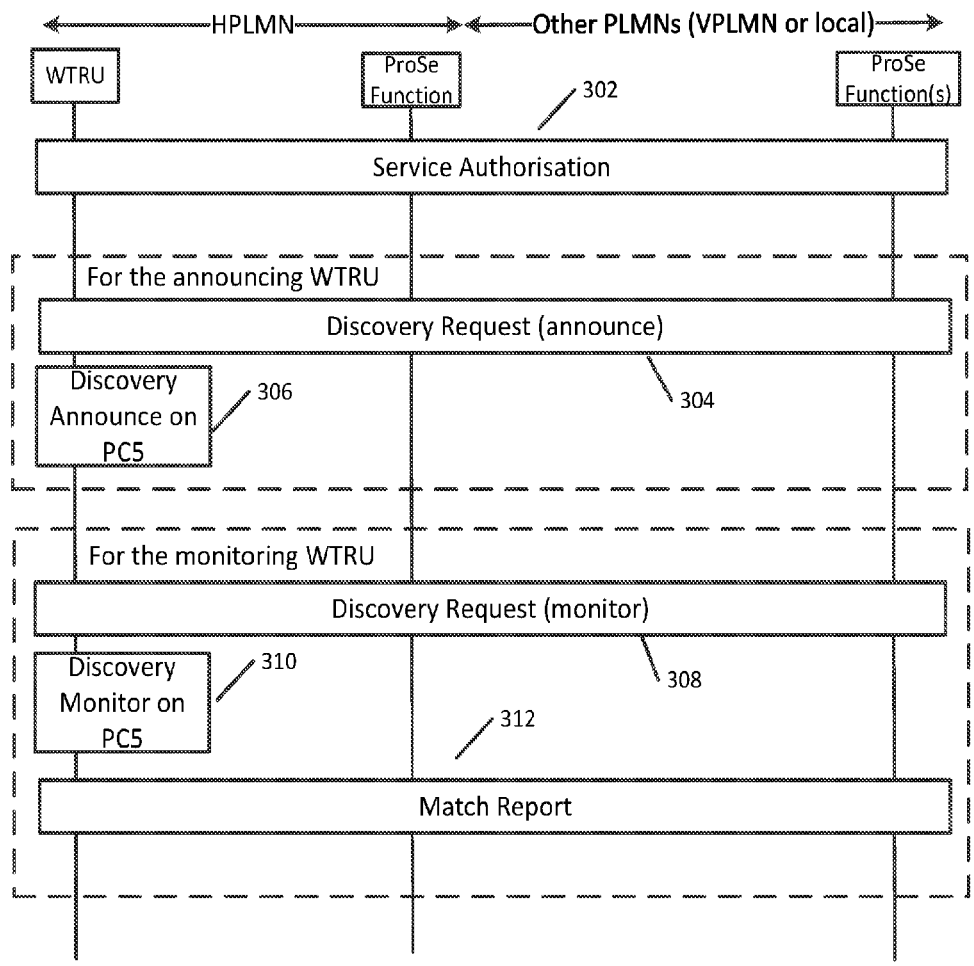
FIG. 3 is an interaction diagram illustrating an example of interaction for a direct discovery embodiment (Model A) by a WTRU.

FIG. 3 is an interaction diagram illustrating an example of interaction for a direct discovery embodiment (e.g., Model A) by a WTRU. Interaction may, for example, occur between a WTRU, ProSe function and other ProSe function(s).

At 302, a WTRU may obtain authorization to announce on or monitor in a particular PLMN, for example, from a ProSe function, e.g., via OMA DM procedures. At 304, an announcing WTRU that is authorized to announce may send a Discovery Announce Request, e.g., via the PC3 reference point, to the ProSe function. The Discovery Announce Request may include a service that the WTRU may want to advertise, e.g., based on a ProSe Application ID.

At 306, if and when the WTRU is authorized, the ProSe function may provide a ProSe application code for the WTRU to announce. At 308, a second WTRU that is attempting to monitor for discovery announcements from other WTRUs in a particular PLMN may send a discovery monitor request to the ProSe function, e.g., via the PC3 reference point. The discovery monitor request may include a service that the WTRU wants to discover or monitor, e.g., based on a ProSe application ID. At 310, if and/or when the second WTRU is authorized by the ProSe function to perform the monitoring, the ProSe function may provide a ProSe application code for the monitoring WTRU look for or attempt to monitor. If the monitoring WTRU successfully receives the discovery request/announcement transmitted by the first WTRU, then at 312, a match report may be generated. The location information may correspond to the location information for the WTRU that broadcast the discovery announcement.

Figure 4:
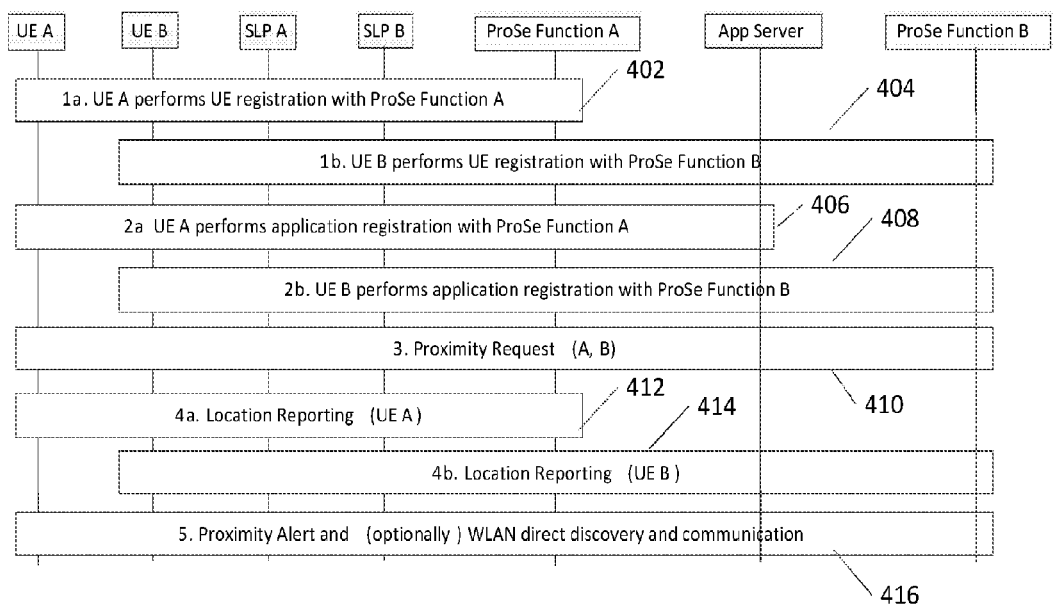
FIG. 4 is a flow diagram of an example of EPC-level ProSe discovery and optional EPC support for WLAN direct discovery and communication.

Rather than or in addition to WTRU-initiated ProSe discovery methods, a core network (e.g., EPC and/or one or more nodes within an EPC) may initiate discovery. For example, EPC-based discovery may utilize a Secure User Plane Location (SUPL) to track locations of ProSe WTRUs and may trigger alerts to be sent to one or more WTRUs when multiple ProSe WTRUs are in proximity to each other. FIG. 4 is a flow diagram of an example of EPC-level ProSe discovery. An EPC may support WLAN direct discovery and communication. Interaction may, for example, occur between a WTRU A, WTRU B, SUPL Location Platform (SLP) A, SLP B, ProSe function A, ProSe function B and/or an App Server. At 402 and 404, for example, one or more WTRUs (e.g., each WTRU) may perform WTRU registration for ProSe with a ProSe function residing in its respective Home PLMN (HPLMN). At 406 and 408, for example, one or more WTRUs (e.g., each WTRU) may perform application registration for ProSe with the ProSe function residing in its respective Home PLMNs.

At 410, WTRU A may make a proximity request for WTRU B. For example, a request may be made that WTRU A be alerted for proximity with WTRU B. A request may indicate a window of time during which the request may be valid. ProSe function A may respond to a request by requesting location updates for WTRU A and WTRU B. Location updates may be periodic, based on a trigger, a combination thereof, etc. ProSe function A may contact SUPL Location Platform (SLP) A, e.g., to request location updates for WTRU A. ProSe function A may contact ProSe function B, e.g., to request location updates for WTRU B. ProSe function B may respond by requesting location updates for WTRU B from SLP B.

At 412 and 414, locations of WTRU A and WTRU B may be reported to their respective ProSe functions, e.g., intermittently. ProSe function B may forward WTRU B's location updates to ProSe function A, e.g., based on conditions set by ProSe function A. ProSe function A may perform proximity analysis on WTRU A and WTRU B locations, for example, whenever ProSe function A receives location updates for WTRU A and/or WTRU B.

At 416, ProSe function A may inform WTRU A that WTRU B is in proximity, for example, when ProSe function A detects that the WTRUs are in proximity. Optionally, ProSe function A may provide WTRU A with assistance information for WLAN direct discovery and communication with WTRU B. ProSe function A may also inform ProSe function B of detected proximity. ProSe function B may, in turn, inform WTRU B of the detected proximity. Optionally, ProSe function B may provide WTRU B with assistance information for WLAN direct discovery and communication with WTRU A.

LTE may support Control Plane and User Plane location service (LCS). U-plane LCS techniques may be based on user plane technology, which may be independent of the underlying network type. SUPL (Secure User Plane Location) may be U-plane location technology for positioning over a wireless network based on secure user plane IP tunnels. SUPL may be an application layer protocol operating over the interface between SUPL Location Platform (SLP) and the SUPL Enabled Terminal (SET).

SLP may comprise functional entities, such as SUPL Location Center (SLC) and SUPL Positioning Center (SPC). SLC may be responsible for coordination and administrative functions to provide location services. SPC may be responsible for the positioning function. SLC and SPC may be architecturally analogous to GMLC and the E-SMLC in the C-plane technique for LCS.

Figure 5:
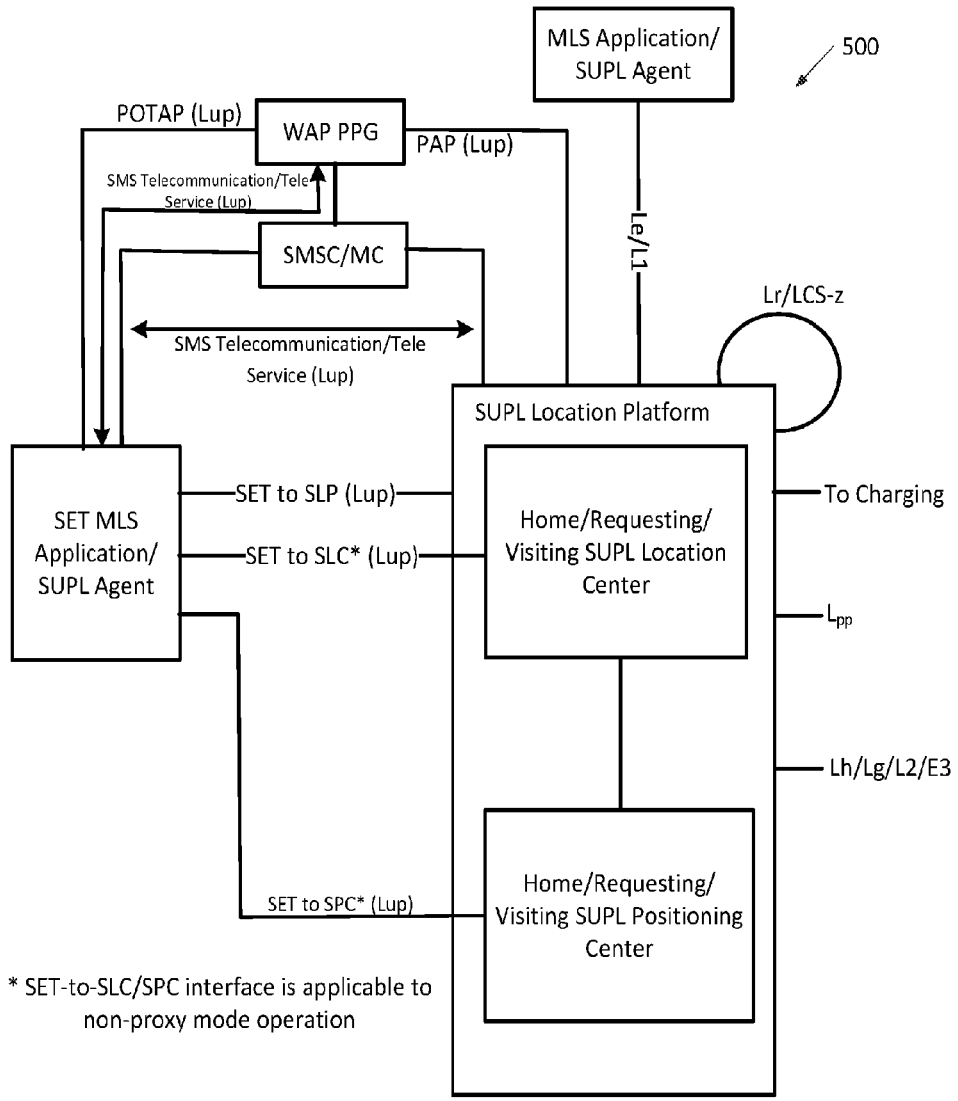
FIG. 5 is a block diagram of an example of secure user plane location (SUPL) architecture.

FIG. 5 is a block diagram of an example of secure user plane location (SUPL) architecture 500. SUPL may support MLP (Mobile Location Protocol), RLP (Roaming Location Protocol) and ULP (User Plane Protocol). MLP may be used in an exchange of LBS data between elements, e.g., between SLP and a SUPL agent or between two SLPs. ULP may be used in an exchange of LBS data between an SLP and a SET.

Figure 6:
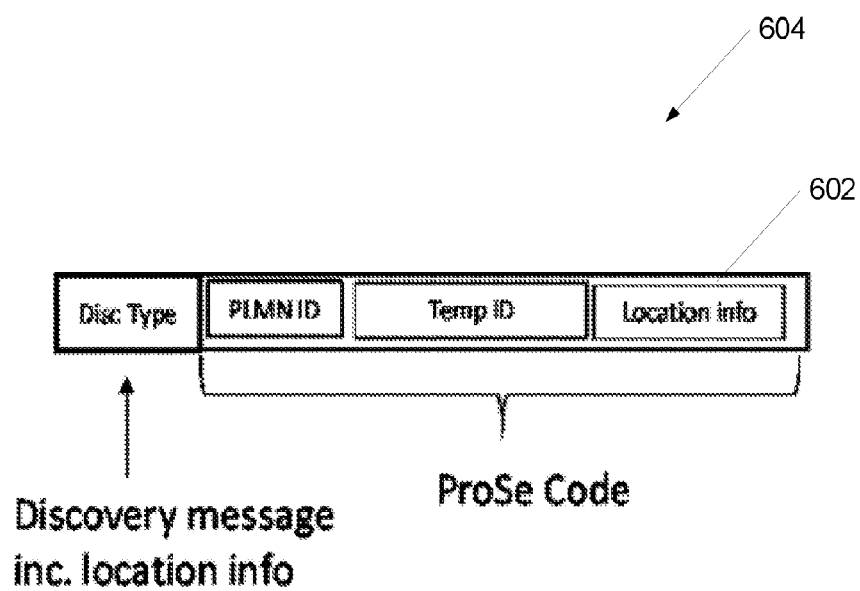
FIG. 6 is an example of location information exchange in discovery messages.

FIG. 6 is an example of location information exchange in discovery messages. WTRUs participating in discovery may exchange location information 602 in discovery messages 604 that may be communicated over the PC5 reference point. An announcing WTRU may determine its location, for example, based on existing location sources, e.g., GPS. An announcing WTRU, e.g., when using Model A, and/or a discoveree WTRU, e.g., when using Model B, may provide location information as part of a discovery message. Location information may be provided, for example, in a special or designated message type during and/or following direct discovery procedures. A ProSe range may be, for example, 500 meters. Location may be provided, for example, with a subset, e.g., a small number of the least significant bits of location coordinates, e.g., given that a WTRU participating in ProSe discovery in a 500 meter range may already have more significant bits of location coordinates. A format of location bits may be well-known.

A monitoring WTRU, e.g., when using Model A, and/or a discoverer WTRU, e.g., when using Model B, that may be authorized to receive and decode a discovery message may determine a location of an announcing WTRU or a discoveree WTRU, for example, by decoding the least significant bits in the message. Full location information suitable for application use may be compiled, for example, using the most significant bits of its own location. A monitoring/discoverer WTRU may estimate the proximity between the two WTRUs.

Figure 7:
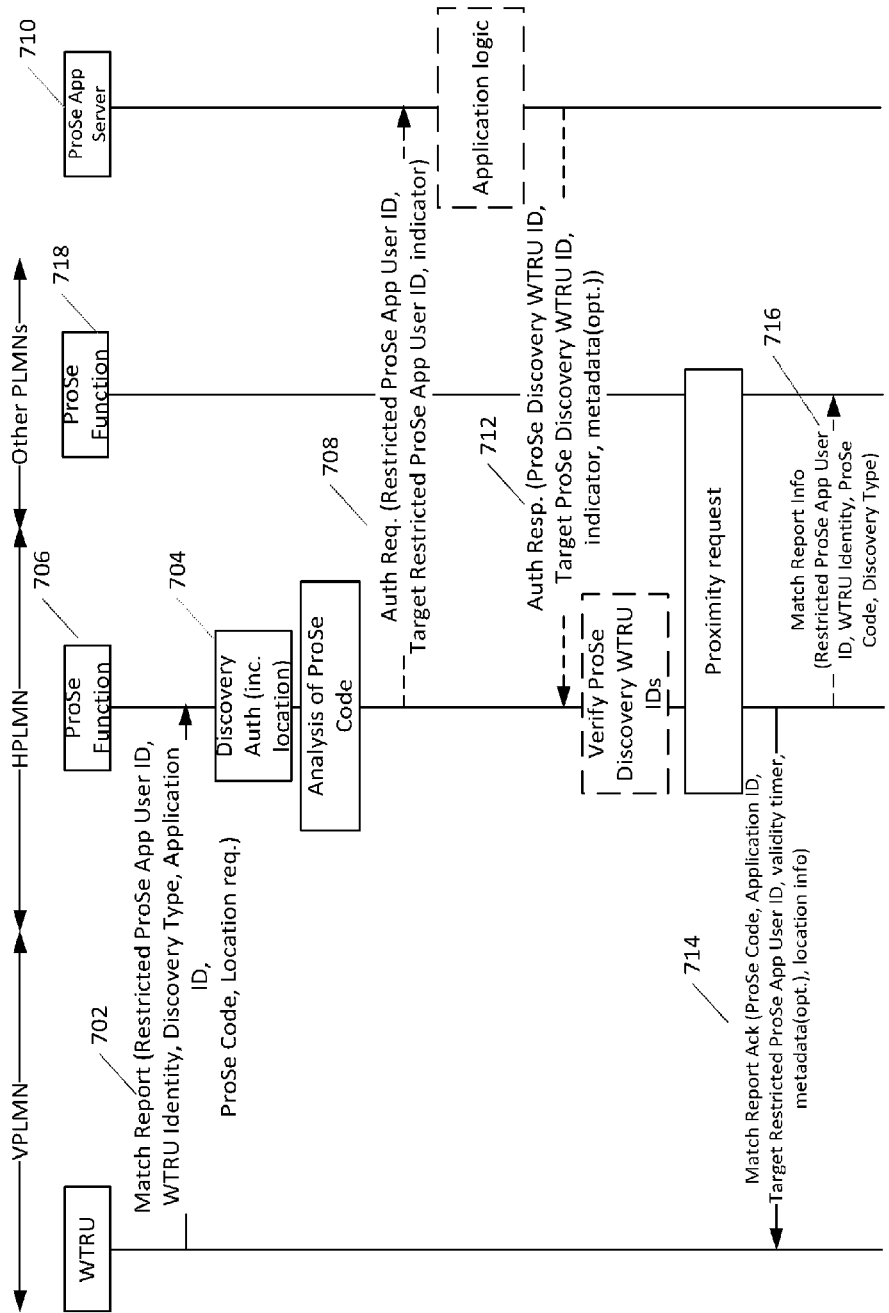
FIG. 7 is an interaction diagram of an example of providing location information in a match report.

FIG. 7 is an interaction diagram of an example of providing location information in a match report. In an example, location information may be provided as part of a match report procedure. A match report may trigger an EPC discovery procedure. A WTRU (e.g., a WTRU that sent a match report) may receive a location of a peer WTRU in a match response from a ProSe function.

At 702, a monitoring WTRU may send a match report and may request to determine the distance and/or direction to/from an announcing WTRU. A message may comprise a "location requested" indication. At 704, a ProSe function 706 may authorize discovery of the announcing WTRU. The ProSe function 706 may, e.g., when a request for location information is authorized, use EPC-level discovery procedures to obtain location information associated with the announcing WTRU. At 708, an authorization request may be sent to a ProSe application server 710. The ProSe application server 710 may respond with an authorization response at 712. The ProSe function 706 may send to a monitoring WTRU a ProSe Application ID and a location of the announcing WTRU, for example, in a match report acknowledgement at 714. A monitoring WTRU may be aware of its own location and may estimate proximity of the monitoring WTRU to the announcing WTRU. At 716, the ProSe function 706 may send match report information to another ProSe function 718.

In ProSe applications, including Public Safety applications, direct exchange, and/or fast exchange of location and other status information between ProSe users or among users in a ProSe group may be desirable. For ProSe WTRUs that are out of coverage, location data exchange via the network may not be possible. Further, a location services (LCS) architecture for E-UTRAN, whether C-Plane technique or U-Plane technique, may not be appropriate for exchanging location information between WTRUs.

Location information may impact user privacy. A WTRU may provide its location information to peers that are authorized to receive location information, e.g., as per user settings in an application. One or more procedures may enforce a user preference in terms of sharing location information. As an example, a user may indicate a privacy preference by selecting one or more privacy settings in a WTRU application that may or may not restrict communication of location information. A user may indicate via interaction with an application client that only a subset of peer users (e.g., family members) may be allowed to retrieve the user's location information. A WTRU with one or more privacy procedures may enforce privacy settings by restricting location information to the specified subset of users according to privacy settings. Other users may be denied access to location information.

A monitoring WTRU that sends a match report may receive location information of its peer. A peer (e.g., an announcing WTRU) may be unaware of location information of a WTRU that has discovered the peer. An announcing WTRU may be provided with location information of monitoring WTRUs that discover the announcing WTRU.

Location information may be computed by various techniques. One method could be a very precise method in which a WTRU may provide geographical coordinates that may enable a recipient to know precise location information. A recipient may respond with its own location coordinates. A recipient may disclose an estimate of how far the recipient is from an announcing WTRU, for example, in lieu of disclosing exact coordinates. Computational techniques may be applied to estimates and/or relative distances, e.g., to protect privacy. For example, in gaming applications, estimated and/or relative distances, rather than exact locations, may be disclosed during a game.

Techniques enabling fast, light-weight exchange of location and other status information between ProSe users or among users in a ProSe group may be disclosed.

Location information may be exchanged via a ProSe function, such as when LCS data and interface are available. A ProSe function may utilize a User Plane based location service, for example, to request location data from the SLP. This may be performed, for example, for EPC-level ProSe discovery. Location data retrieved by a ProSe function or functions may be further exchanged between ProSe users or among a group of ProSe users as part of a discovery procedure.

Location information may be exchanged, for example, in Model A and Model B Direct Discovery. An announcing WTRU may indicate in a Discovery Request message, e.g., to its home ProSe function (e.g., ProSe function of its HPLMN), that it is willing to reveal its location data to monitoring WTRUs.

An indication by a WTRU that it may share location data to monitoring WTRUs may, for example, be based on WTRU pre-configuration, user preference settings, and/or interaction with an application server that provides this information to the WTRU. A home ProSe function may also learn that the announcing WTRU's location data may be publicized from a WTRU's profile in HSS, for example, during the authorization procedure.

Location may be disclosed to selected WTRUs or groups, for example, if a discovery request indicates it is for restricted discovery, such as a selected list of WTRUs or groups permitted to discover the announcing WTRU.

A WTRU may also revoke an indication allowing location disclosure, which may revoke access to location information by participating WTRUs. A WTRU may, for example, revoke permission through a Discovery Request indicating that it does not allow its location to be disclosed.

A home ProSe function may initiate Location Request to the serving SLP of the announcing WTRU and retrieve the WTRU's location data, for example, when there is an indication that an announcing WTRU's location data is allowed to be disclosed to other monitoring WTRUs. A home ProSe function may store an announcing WTRU's location data in a WTRU context. A home ProSe function may periodically update its stored data, e.g., based on periodic retrieval of the most up-to-date location data from the SLP and may update its stored data.

A monitoring WTRU may indicate in a Discovery Request message to its home ProSe function that it wants to know or monitor location data for one or more WTRUs. A monitoring WTRU may indicate in a match report message to its home ProSe function that it wants location data of a WTRU, for example, that it has detected. A home ProSe function may retrieve the latest location data from the announcing WTRU's context and return it to a monitoring WTRU in a match report acknowledgement (ACK) message, e.g., in response to receiving a match report from a monitoring WTRU.

Figure 8A:
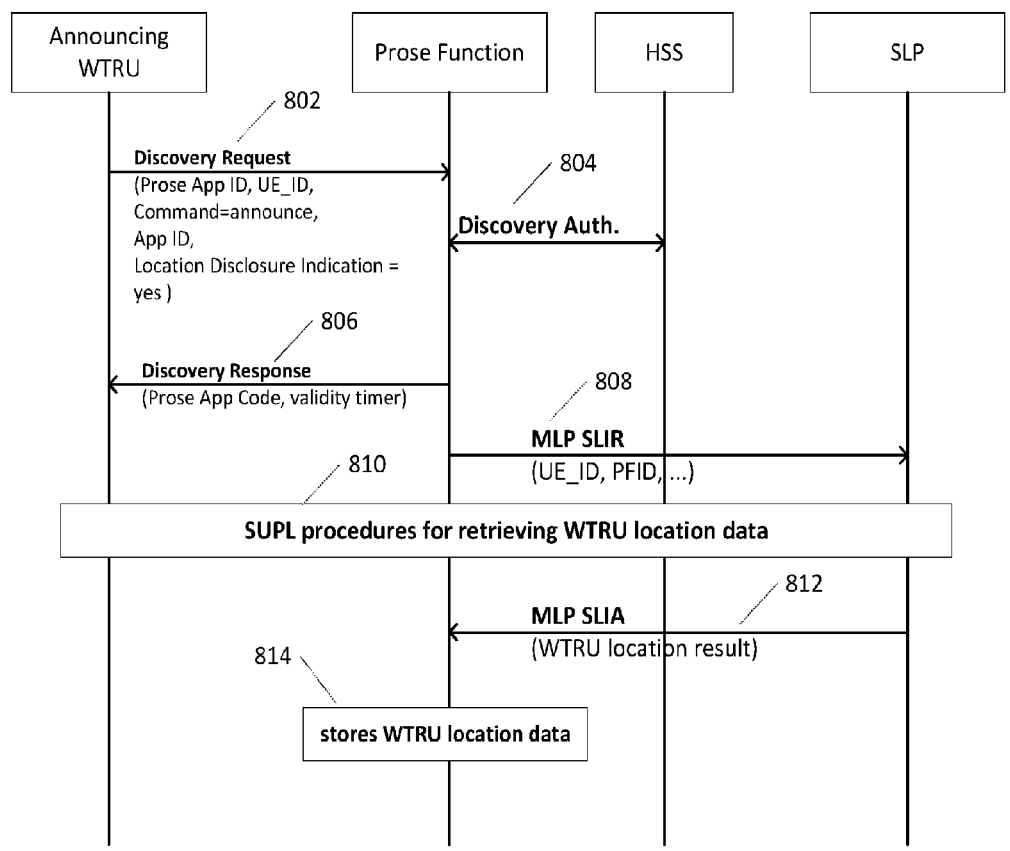
FIGS. 8A and 8B are interaction diagrams of an example of interaction during a location data exchange of discovery and location data available from a service location protocol (SLP).
Figure 8B:
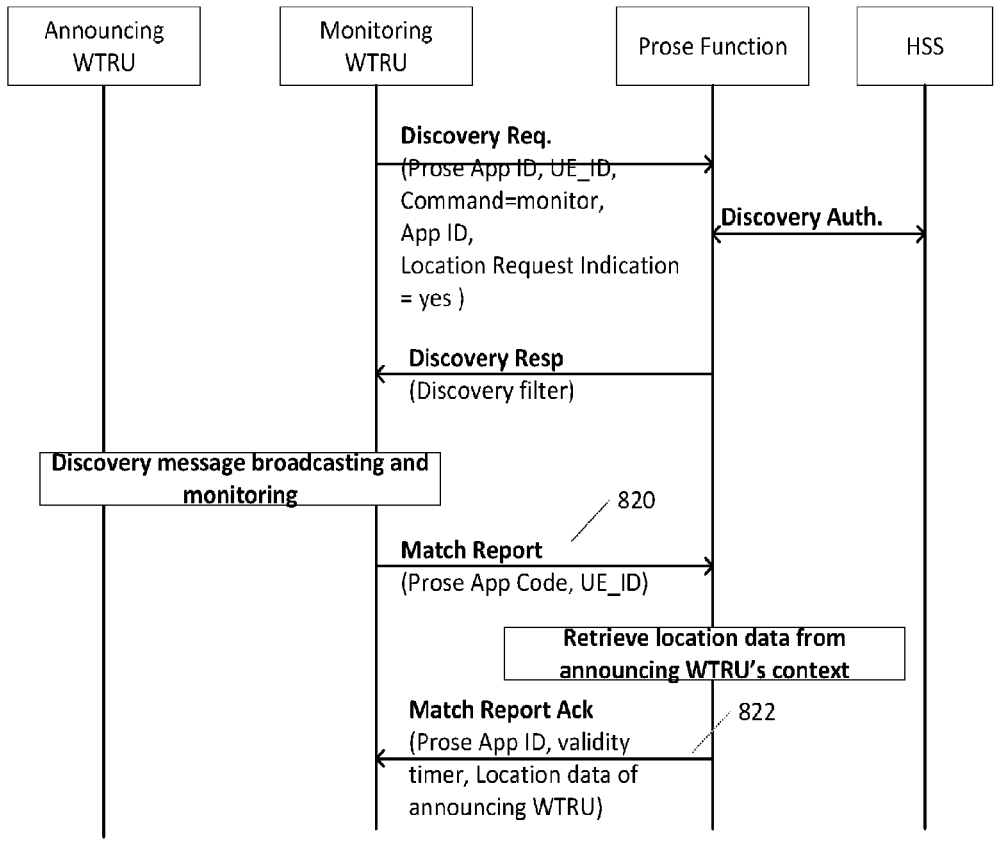

FIGS. 8A and 8B are interaction diagrams of examples of interaction during a location data exchange of discovery and location data available from a service location protocol (SLP). Interaction may occur, for example, between an announcing WTRU, a ProSe function, HSS, SLP, and a monitoring WTRU.

At 802, an announcing WTRU may send a discovery request to a ProSe function. The discovery request may include a ProSe application identifier, a WTRU identifier, an announce command, an application identifier, and/or an indication that the announcing WTRU may disclose location information. At 804, a discovery authorization may be communicated between the ProSe function and an HSS. At 806, the ProSe function may send a discovery response to the announcing WTRU. The discovery response may include a ProSe application code and/or a validity timer. At 808, 810, 812, and 814, procedures may be performed to retrieve location data from the SLP. These procedures may be triggered, for example, by an announcing WTRU's discovery request, after a monitoring WTRU's match report is received, and/or a variety of other events.

An inter-ProSe function procedure may be used to retrieve location data, for example, when an announcing WTRU and monitoring WTRU are not served by the same home ProSe function. A monitoring WTRU's home ProSe function may forward a match report to an announcing WTRU's home ProSe function at 820, for example, in response to receiving the match report. A monitoring WTRU's home ProSe function may indicate in a message that the announcing WTRU's location data is requested. An announcing WTRU's home ProSe function may return location data to a monitoring WTRU's home ProSe function, for example, if the request is authorized. At 822, a monitoring WTRU's home ProSe function may forward location data to a monitoring WTRU in a match report acknowledgement (ACK) message.

Figure 9:
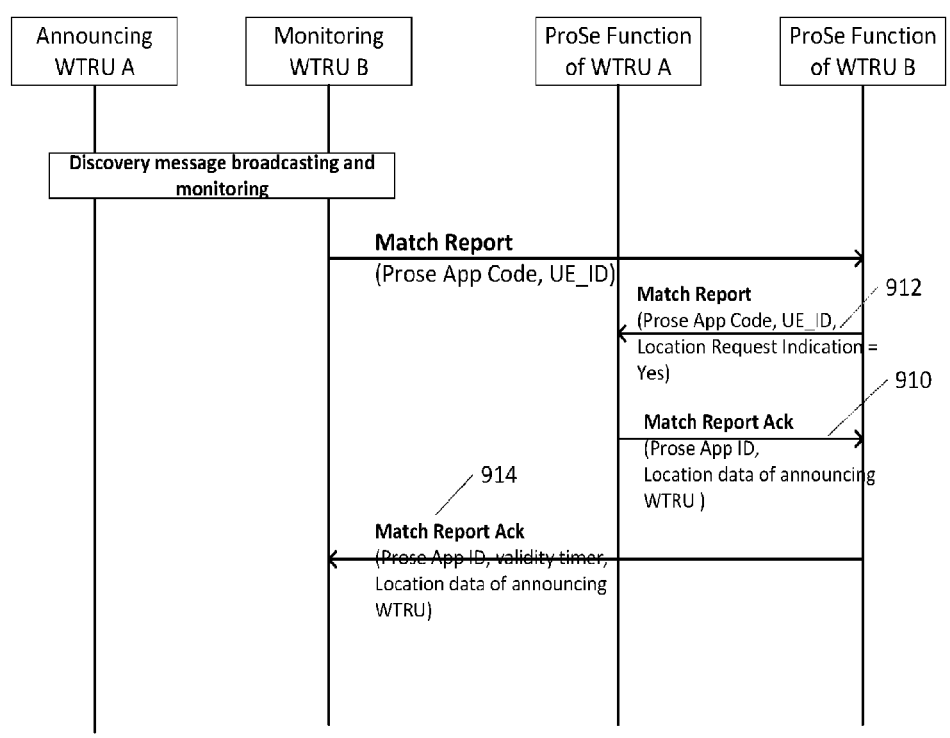
FIG. 9 is an interaction diagram illustrating an example of interaction during location data exchange discovery when an announcing WTRU and a monitoring WTRU are served by a different home ProSe function.

FIG. 9 is an interaction diagram illustrating an example of interaction during location data exchange discovery when an announcing WTRU and a monitoring WTRU may be served by a different home ProSe function. Interaction may occur, for example, between announcing WTRU A, ProSe function of WTRU A, monitoring WTRU B and ProSe function of WTRU B.

A ProSe function of an announcing WTRU may indicate a lack of support for location data exchange between ProSe users or a lack of support for retrieving location data from SLP in a discovery response message, e.g., after receiving a discovery request message from an announcing WTRU indicating a willingness to disclose its location. However, the discovery process may continue.

A ProSe function of a monitoring WTRU may indicate a lack of support for location data exchange between ProSe users in a discovery response message or match report acknowledgement (ACK) message at 910, e.g., after receiving a discovery request message or match report message in which the location data of the announcing WTRU is requested at 912. However, the discovery process may continue.

A ProSe function may indicate an unavailability of the location data in a match report acknowledgement (ACK) message to a monitoring WTRU at 914, for example, when a ProSe function supports the location exchange functionality but location data is not available.

Location information may be exchanged for EPC-level discovery. A ProSe-enabled WTRU may indicate in a ProSe registration request message that its location is allowed to be disclosed, e.g., to other ProSe WTRUs. An indication that location information may be disclosed may, for example, be based on WTRU pre-configuration or user preference settings. A home ProSe function may also learn that a WTRU's location data may be publicized from a WTRU profile in HSS, e.g., as part of an authorization procedure.

A WTRU may also revoke an indication or authorization allowing location disclosure or reporting, which may revoke access to location information by participating WTRUs. A WTRU may revoke authorization to allow location reporting, for example, by updating its profile in ProSe. A profile may be updated through a ProSe registration request, e.g., with an indication that it does not allow its location to be disclosed.

Figure 10:
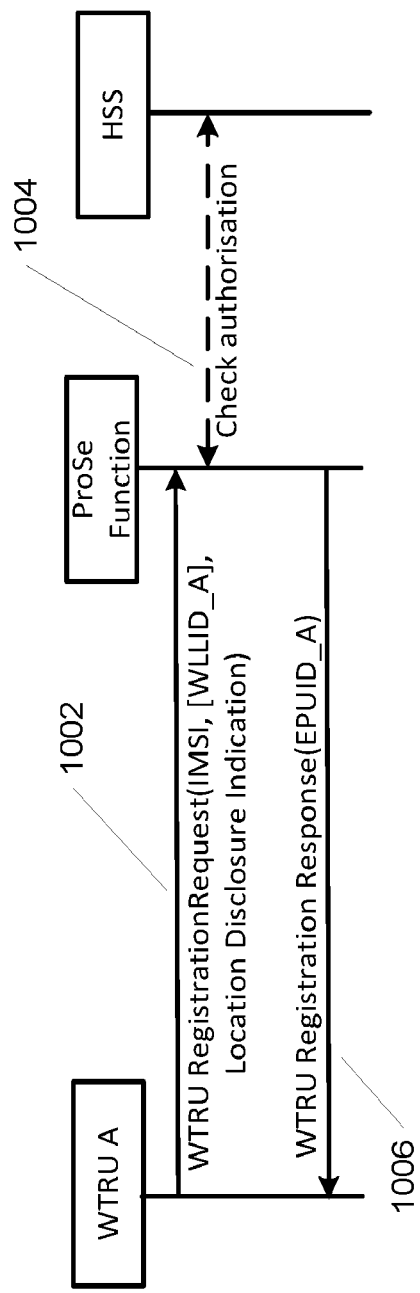
FIG. 10 is an interaction diagram illustrating an example of interaction during WTRU registration with a Location Disclosure Indication.

FIG. 10 is an interaction diagram illustrating an example of interaction during WTRU registration with a Location Disclosure Indication. Interaction may occur, for example, between announcing WTRU A, ProSe function of WTRU A, and/or HSS.

At 1002, a WTRU (e.g., WTRU A) that initiates a proximity request may include an indication in the proximity request message to request the location of one or more other WTRUs, e.g., WTRU B. WTRU A's ProSe function may include in a proximity request forwarded to WTRU B's ProSe function an indication that WTRU A and WTRU B are not served by the same ProSe function. At 1004, WTRU B's ProSe function may determine whether WTRU A may access WTRU B's location information. At 1006, if so authorized, WTRU B's ProSe function may indicate that WTRU B's location is allowed to be disclosed, for example, in a proximity request acknowledgement (ACK) message sent to WTRU A's ProSe function. WTRU B's ProSe function may indicate, e.g., in a proximity request acknowledgement (ACK) message, that the location request is rejected. However, a discovery procedure may continue regardless whether a location request is accepted.

Figure 11:
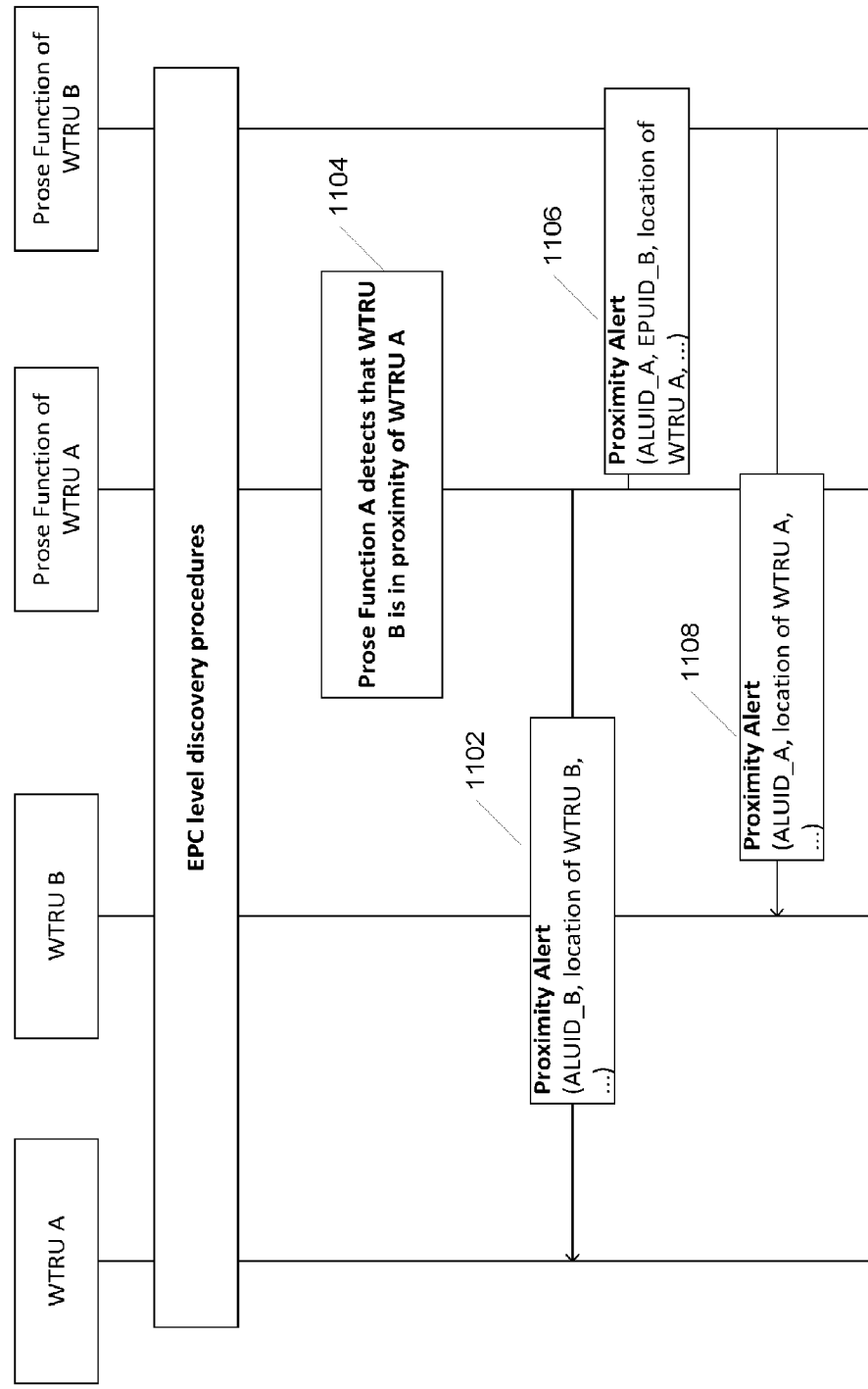
FIG. 11 is an interaction diagram illustrating an example of interaction during a location information exchange via an EPC-level discovery procedure.

FIG. 11 is an interaction diagram illustrating an example of interaction during a location information exchange via an EPC-level discovery procedure. Interaction may occur, for example, between announcing WTRU A, ProSe function of WTRU A, Monitoring WTRU B and WTRU B's ProSe function.

WTRU A's ProSe function may include WTRU B's latest location information in a proximity alert message at 1102, for example, when WTRU A's ProSe function detects that WTRU B is in proximity to WTRU A at 1104. WTRU A's ProSe function may send WTRU B's latest location information to WTRU A. WTRU A's ProSe function may include WTRU A's location in a proximity alert message forwarded to WTRU B's ProSe function at 1106, for example, when WTRU A's context indicate its location may be disclosed. WTRU B's ProSe function may forward WTRU A's location information to WTRU B at 1108.

ProSe function may also include WTRU location data in assistance information, which ProSe function may send to WiFi-direct capable WTRUs to assist WiFi-direct link establishment, for example, when WTRUs are capable of exchanging location data over WiFi-direct link.

Location information may be exchanged via ProSe function, for example, when LCS data and interface may not be available. Location information may be exchanged, for example, for Model A and Model B discovery.

Figure 12:
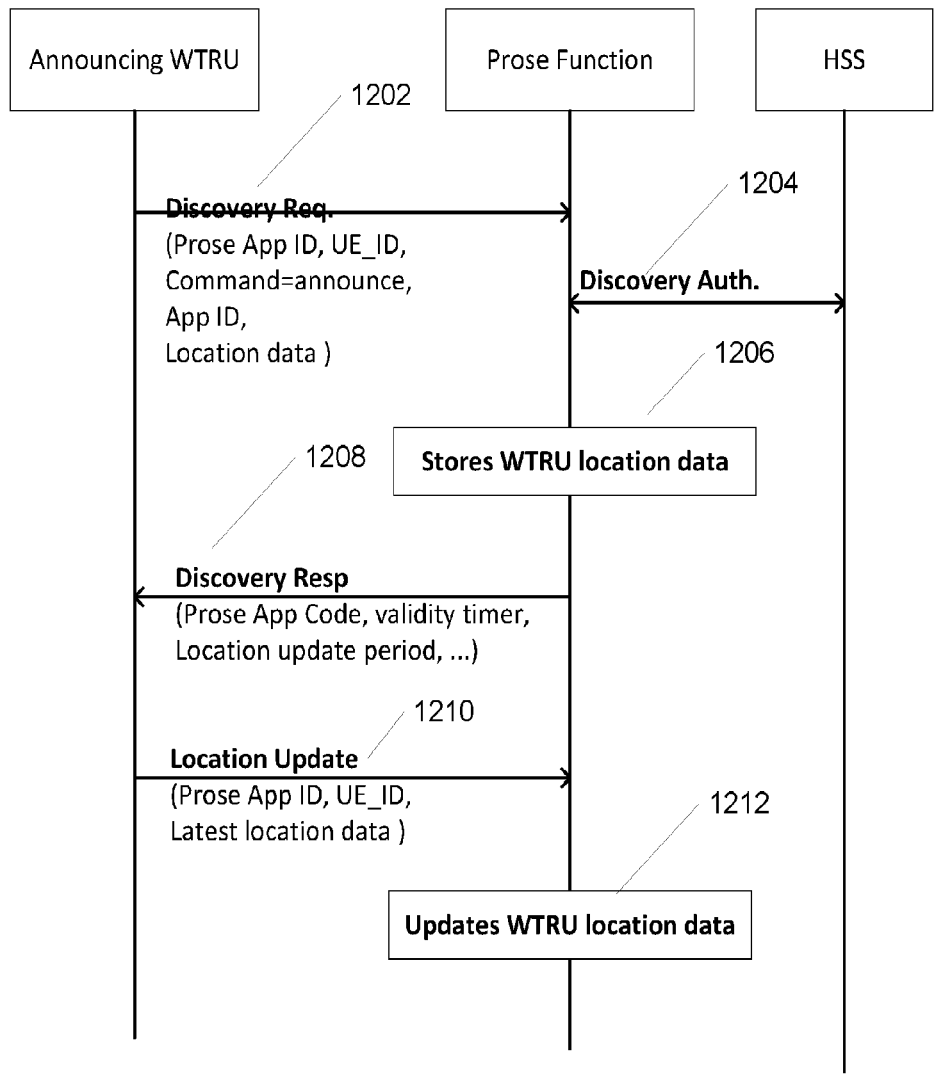
FIG. 12 is an interaction diagram illustrating an example of interaction when location data is received from a Global Navigation Satellite System (GNSS) capable WTRU.

FIG. 12 is an interaction diagram illustrating an example of interaction when location data is received from a Global Navigation Satellite System (GNSS) capable WTRU. Interaction may occur, for example, between announcing WTRU A, ProSe function of WTRU A and HSS.

At 1202, an announcing WTRU or monitoring WTRU may include its own location data in a discovery request message, for example, when ProSe WTRUs are Global Navigation Satellite System (GNSS) enabled and willing to disclose their location data. A WTRU may send such a discovery request message to its home ProSe function. The ProSe function may store the WTRU's location data in its context at 1206.

An announcing WTRU may periodically update its latest location information with its ProSe function, for example, following the discovery request from the announcing WTRU or monitoring WTRU is authorized at 1204 and accepted. A periodic location update period may, for example, be preconfigured or set by a user. The ProSe function may also configure an update period in a discovery response message at 1208. The ProSe function may update stored location data in a WTRU's context at 1212, such as when it receives the latest location data at 1210. A format of location data may, for example, be as shown in Sec. 10.7 of "User Plane Location Protocol," Draft Version 2.0," Mar. 28, 2008, OMA-TS-ULP-V2_0, Open Mobile Alliance.

A monitoring WTRU's ProSe function may include, for example, the announcing WTRU's latest location data in a match report acknowledgement (ACK) message, such as when an announcing WTRU's location data is allowed to be disclosed. An inter-ProSe function exchange of announcing WTRU's location data, e.g., as described with regard to FIGS. 8A and 8B, may be utilized, for example, when an announcing WTRU and a monitoring WTRU are not served by the same home ProSe function.

Location and other status information may be exchanged via the PC5 reference point. In an example, location and status information may be exchanged via discovery. An announcing WTRU may include its location data directly in a discovery message and broadcast it over the PC5 air interface, for example, when the announcing WTRU is GNSS capable. The announcing WTRU may include the latest location data in a discovery message.

Location data in a message may include a minimum set of location data defined, for example, in Sec. 10.7 of "User Plane Location Protocol," Draft Version 2.0," Mar. 28, 2008, OMA-TS-ULP-V2_0, Open Mobile Alliance. For example, a message may include "Latitude" and "Longitude" information. A message may also include a timestamp. Different message sizes may be defined for discovery messages with and without location information. An indication, e.g., a 1-bit indication, may be inserted in a MAC packet header to indicate the presence of location information in the message.

Figure 13:
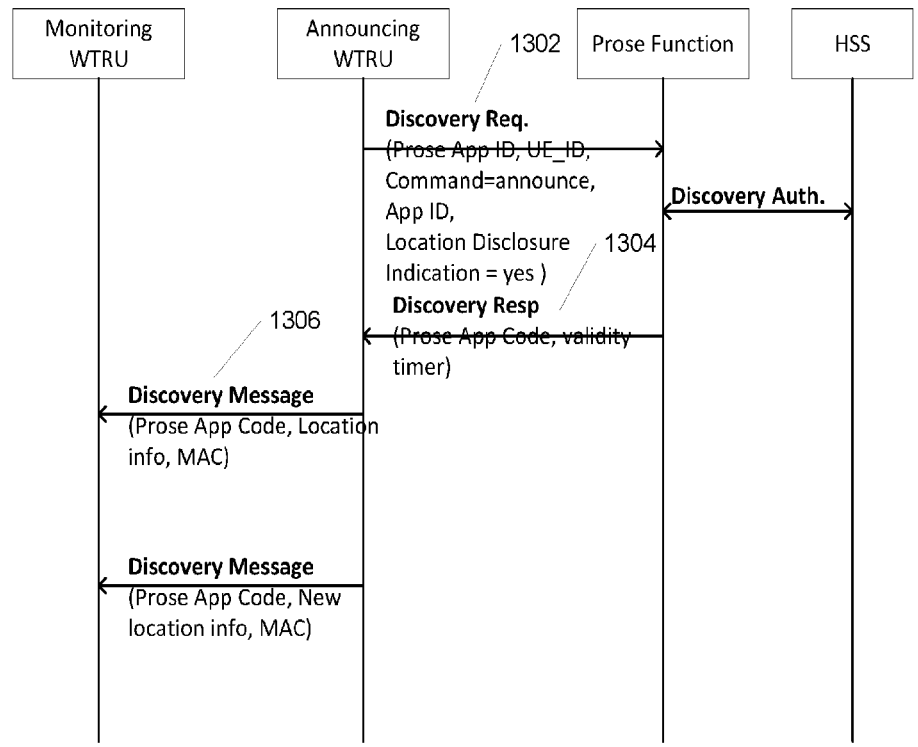
FIG. 13 is an interaction diagram illustrating an example of interaction when location information is broadcast in a discovery message.

FIG. 13 is an interaction diagram illustrating an example of interaction when location information is broadcast in a discovery message. Interaction may occur, for example, between a monitoring WTRU, an announcing WTRU, ProSe function and HSS.

In combination with or as an alternative to location information, other status information, such as, but not limited to, presence status and coverage status (e.g., in or out of coverage), may be communicated between ProSe users in any one or more of the variety of techniques disclosed herein. A discovery message header may indicate what kinds or types of status information is/are present, e.g., indicate various individual and/or combined types of status and location information in a discovery message.

Location or status information may be broadcast, for example, in plain text. Location or status information, e.g., sensitive location or status information broadcast by some ProSe applications, may be broadcast in other forms or formats, e.g., in encrypted form. As an example, an announcing WTRU may include its latest location or status data in a discovery request at 1302. A ProSe function may return encrypted location/status data in the discovery response at 1304. An announcing WTRU may broadcast encrypted location or status data over PC5 air interface.

A monitoring WTRU may receive encrypted location or status information in a discovery message at 1306 and/or may receive updated encrypted location or status information in a discovery message at 1308. A monitoring WTRU may forward encrypted data to a ProSe function in a match report message. ProSe function may decrypt the data and return it to the monitoring WTRU, e.g., in a match report acknowledgement (ACK) message. A monitoring WTRU's ProSe function may forward encrypted data to an announcing WTRU's ProSe function for decryption, for example, when an announcing WTRU and monitoring WTRU are not served by the same ProSe function. An encryption/decryption algorithm may be a function or implementation of a ProSe function.

Figure 14:
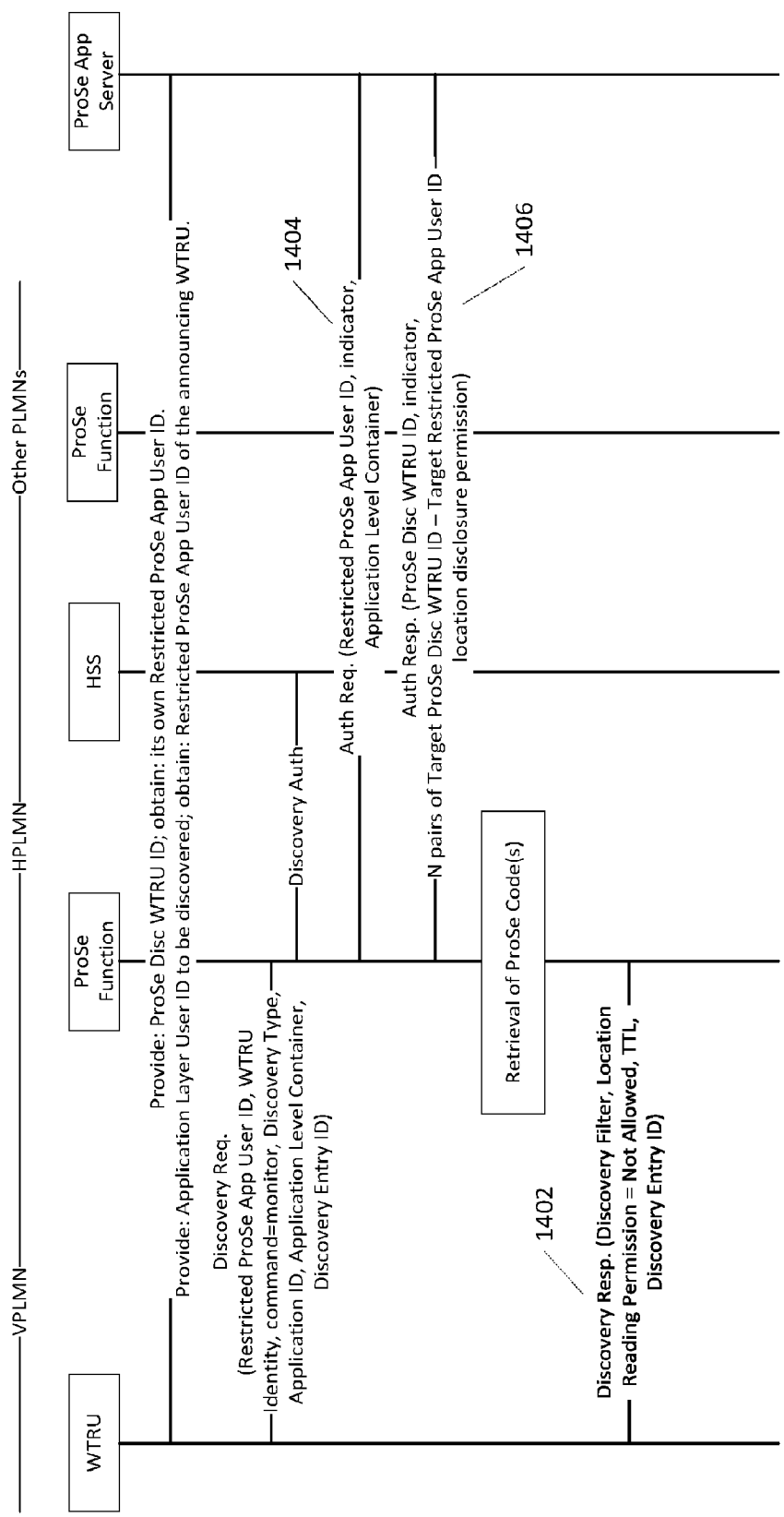
FIG. 14 is an interaction diagram illustrating an example of a restricted discovery procedure.

FIG. 14 is an interaction diagram illustrating an example of a restricted discovery procedure. A monitoring/discoverer WTRU may receive a discovery response message with a flag indicating, for example, whether the monitoring/discoverer WTRU is allowed to receive or access a target announcing/discoveree WTRU's location data that may be in a PC5 discovery message. A flag may be part of a discovery filter in a discovery response message. A ProSe function may set a flag in a discovery response message at 1402, for example, based on an announcing WTRU application level permission setting for location disclosure. A restricted discovery process may be implemented. A ProSe function may verify discovery permission of target restricted application user IDs, for example, with a ProSe application server at 1404. At 1406, a ProSe application server may return a location disclosure permission flag for target restricted application users allowed to be discovered. Location data in a PC5 discovery message may be retrieved and presented to a user, for example, when a flag in the discovery response or discovery filter indicates reading a target WTRU's location is permitted. Location data in a PC5 discovery message may be ignored or discarded, for example, when a flag indicates reading a target WTRU's location is not permitted.

Location and status information may be exchanged directly via the PC5 user plane. Location and other status information may be exchanged between ProSe users or among ProSe groups via the PC5 user plane. In an example, a dedicated ProSe bearer and a corresponding Logical Channel (LC) may be configured at a WTRU for location and status communication. A default Logical Channel ID may be reserved for the LC, e.g., for location and status communication.

There may be one (e.g., only one) ProSe bearer within a ProSe source and destination pair. A WTRU may configure a, e.g., one, dedicated ProSe bearer for location and status communication within each pair, for example, when a WTRU is communicating with multiple ProSe users or ProSe groups.

Location and status data carried by a dedicated LC may or may not be multiplexed with other LCs. A dedicated LCID in a MAC header may denote which part of a packet is location or status information. An indication may be provided in a sub-header as to which individual or combination of location and/or other status information is present, for example, when a variety of individual and combined information may be provided in a packet or packets.

Figure 15:
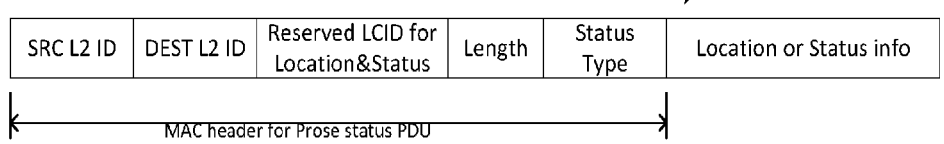
FIG. 15 is an example of ProSe status of a Media Access Control (MAC) header for a Packet Data Unit (PDU) without multiplexing.
Figure 16:
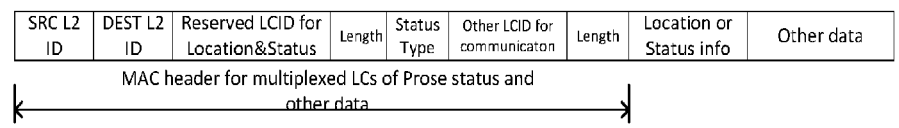
FIG. 16 is an example of ProSe status of a MAC header for a PDU with multiplexing.

FIG. 15 is an example of ProSe status of a Media Access Control (MAC) header 1500 for a Packet Data Unit (PDU) without multiplexing. FIG. 16 is an example of ProSe status of a MAC header 1600 for a PDU with multiplexing. A ProSe status PDU may be encrypted, e.g., in the same way as other ProSe data.

WTRU behavior relative to location information may be based on a configuration or application layer setting/request. A WTRU may periodically broadcast location information over a PC5 user plane. A WTRU may broadcast location information one time, for a period of time, etc.

A determination may be made as to when and/or how to provide location information in discovery messages. Verification may be made, e.g., prior to sending location information, for example, to ensure that a recipient is authorized to receive location information. Authorization from a user or WTRU (e.g., WTRU1) to share location information with other users or WTRUs (e.g., WTRU2) may be set and/or enforced at an application layer e.g. by interaction between a WTRU (e.g., WTRU1) and an application server, or by interaction between a WTRU (e.g., WTRU2) and a ProSe function.

Exchanging location information may include or imply sending location information and/or receiving of location information. Exchanging location information may include or imply a computation of location information at one or more times, e.g., before sending location information, processing location information after receiving it and/or processing location information prior to sending out other (e.g., computed or estimated) location information. Location information may have one or more forms or types, e.g., information in the form of coordinates, area, and/or relative distance to another entity. Location information may include other information, e.g., direction information.

HSS subscription information for a WTRU may be updated to reflect whether a WTRU is allowed to exchange location information as part of discovery. Information may be per WTRU, per WTRU per application, per WTRU per service, etc. Information may indicate a type of location information, e.g., precise information, estimate, relative distance, etc.

A WTRU may set preferences at an application layer indicating whether to share location information with other peer WTRUs. A WTRU may indicate via an application (client), for example, which peer users are allowed to access its location information and/or which users are not allowed to access location information. A WTRU may set one or more techniques to compute location information, e.g., using SUPL, GPS, user input location information, etc. An application server may inform a WTRU and/or application client in a WTRU as to which technique should be used to compute location information. One or more (e.g., a list of) techniques may be known or provided and may be designated in an order (e.g., ascending priority, descending priority), for example, based on WTRU capabilities. A list may indicate, for example, SUPL, GPS, or other. A WTRU may, for example, select SUPL when supported, select GPS when SUPL is not supported and select "other" when SUPL and GPS are not supported. A WTRU may indicate a type or degree of precision, e.g., precise information, estimate, relative distance, etc.

A WTRU may indicate whether location information should be sent in a PC5 discovery message, for example, when the WTRU sends a Discovery Request to the ProSe function. The ProSe function may verify whether the WTRU is allowed to indicate according to HSS subscription information. The ProSe function may check with the application server, for example over PC2 reference point interface between the ProSe function and the application server, whether a WTRU is authorized to exchange location information with peer WTRUs. A WTRU may indicate whether precise information, an estimate, relative distance, etc., may be used to specify location.

An application server may notify a ProSe function whether a WTRU is allowed to exchange location information and may provide a list of target WTRUs with which a WTRU is allowed to exchange location information. The application sever may indicate the type of location information or the source of location information (e.g., SUPL, GPS, or other) that may be used by the WTRU. The application server may indicate whether precise information, an estimate, relative distance, etc. may be used to specify location.

A ProSe function may respond to a WTRU. A response may indicate whether location information is allowed to be exchanged. A response may indicate a list of authorized WTRUs. Authorized WTRUs may be identified, for example, by a ProSe WTRU ID, a Restricted ProSe Application User ID, a ProSe Code or a Discovery Filter. A ProSe function may indicate a type of location information (e.g., SUPL, GPS, or other) that should be used by a WTRU. A ProSe function may indicate whether precise information, an estimate, relative distance, etc. may be used to specify location.

A WTRU having any status or designation, e.g., a WTRU announcing a discovery request, responding to a discovery request, discoverer, discoveree, may exchange location information, for example, when permitted to do so (e.g., according to a ProSe function) by sending or including location information in one or more discovery messages. A WTRU may compute and include computed location information in one or more discovery messages using an indicated method (e.g., SUPL, GPS, or other).

A discoveree WTRU may, for example, be pre-configured or informed by a ProSe function (PF) whether location information should be exchanged as part of the discovery. An indication, e.g., by preconfiguration or information, may be, for example, per WTRU, per application, per restricted ProSe application user ID, per ProSe response code or per discovery filter. A monitoring WTRU or a discoveree WTRU may verify whether to exchange location information for a code or associated/corresponding discovery filter, for example, when a match occurs that triggers the sending of a ProSe response code. A WTRU may exchange location information in a response, for example, when pre-configured or informed to do so by a PF (e.g., configured per WTRU, per application, per restricted ProSe application user ID, per ProSe response code, or per discovery filter).

Location information procedures may be incorporated in discovery requests and discovery response procedures, such as a request for information exchange, a request to verify authorization for location exchange by a WTRU, a user, a WTRU per application, a user per application, etc. Location information procedures may be incorporated in other procedures, for example, between a ProSe function (PF) and an application server (e.g., ProSe application server (PAS)), between two PFs, or between the HSS and the PF. Location information procedures may be may be applied to Model B discovery, Model A discovery with or without using the PC2 reference point interface between a PF and a PAS.

A location exchange request may comprise a location information response, location exchange authorization (e.g., response), location exchange indication, etc. A location exchange request may comprise determining whether a user or WTRU is capable of supporting location exchange over PC5 (e.g., direct transmission over the air) or PC3 (e.g., IP communication with the PF) reference points. A location exchange request may comprise determining the type of location information to exchange, e.g., whether to compute or process location information or otherwise exchange location information, e.g., using SUPL, GPS, or other location computation/retrieval methods. A location exchange request may comprise determining the type of computation, e.g., precise computation or an estimate or a relative distance between any two nodes. A location exchange request may comprise determining the frequency of location computation, e.g., how often should location information be refreshed at the WTRU. A location exchange request may comprise triggers to refresh location information, e.g., when a time window expires, when a WTRU changes cells, when a WTRU enters a new PLMN area, when a WTRU enters a new tracking area, when a WTRU performs a handover, when a WTRU changes an eNB, when a WTRU enters connected mode, when a current retrieval method (e.g., GPS) is no longer available, etc.

Figure 17:
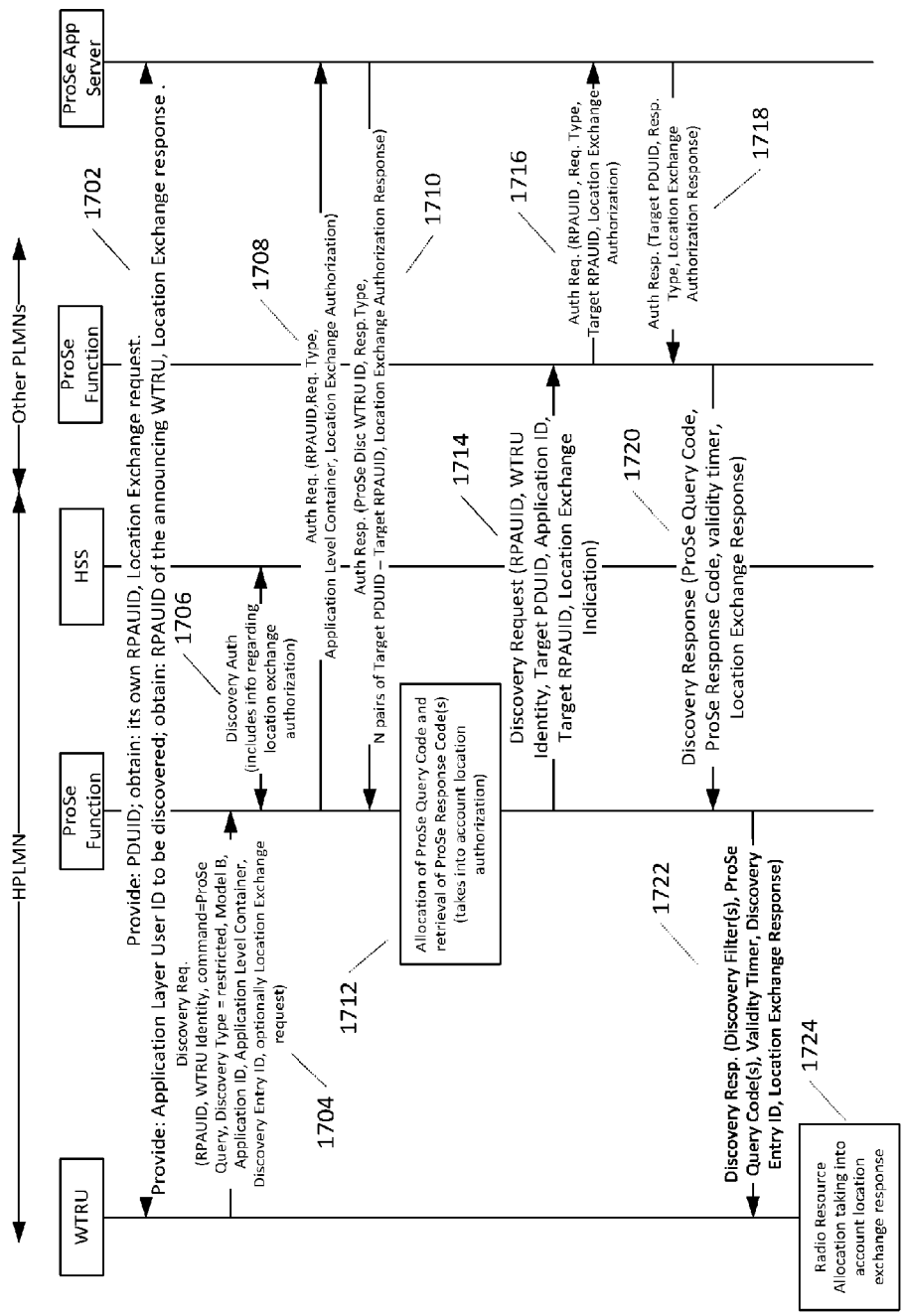
FIG. 17 is an interaction diagram illustrating an example of a discoverer location exchange procedure.

FIG. 17 is an interaction diagram illustrating an example of discoverer location exchange. Discoverer location exchange may be implemented, for example, in a non-roaming Model B discovery procedure.

At 1702, a WTRU or user may set discovery preferences over an application layer (e.g., out of 3GPP scope). A WTRU may have a location exchange request in settings or application layer signaling, for example, as part of discovery preferences. Discovery preferences information may include an indication whether a WTRU should send/receive location information, e.g., for all peer users, per peer user identified by a peer application user identity, etc. A location exchange request may have information about a type of location information desired (e.g., SUPL, GPS, etc.), a computation type (e.g., precise/exact, estimate, relative distance, etc.). A PAS may inform a WTRU whether it is allowed to exchange location information and/or may provide other information for the contents of a location exchange request.

At 1704, a WTRU may include a location exchange request in a discovery message that it sends to the ProSe function.

At 1706, an HSS may provide information about a WTRU regarding a location exchange, for example, when the WTRU is allowed to exchange location information, e.g., per application.

At 1708, a ProSe function may request authorization from a ProSe application server (PAS) for location exchange for a WTRU. A PAS may be requested to indicate whether a WTRU is allowed to do one or more things, e.g., transmit location information, receive location information, etc. A request may seek authorization for other information, such as a type of location information to be exchanged (e.g., SUPL, GPS, etc.), a precision of location information, etc.

At 1710, a PAS may inform a PF whether a WTRU is allowed to exchange location information and/or other information, such as a type of location information to be exchanged (e.g., SUPL, GPS, etc.), a precision of location information, etc. A PAS may take into account whether the application layer has made or should make the decision, e.g., whether a user is allowed to exchange location information, whether a user has requested to exchange location information, whether the application needs location information, etc.

At 1712, a PF may allocate a set of ProSe query codes for a WTRU. The PF may account for an indication received from the PAS in the authorization response. As an example, a PF, e.g., when authorized to exchange location information, may allocate a ProSe code where a segment of the total length may include the code and another segment may be reserved for location information. A reserved segment may be set to a value (e.g., a well-known value such as all zeros or all ones), for example, to indicate an allocation. A PF may allocate a code that uses the full length available for the code without reserving a segment for location information, for example, when the PAS indicates that the WTRU or user is not authorized to exchange location information.

At 1714, a first PF in the HPLMN that contacts other PFs may include a Location Exchange Indication.

At 1716 and 1718, an authorization request and an authorization response may be exchanged. This authorization request and authorization response may be similar to the authorization request and authorization response at 1708 and 1710.

At 1720, PFs in other PLMNs may allocate a set of ProSe query codes that may account for the location exchange response. As an example, a PF, e.g., when location exchange is permitted, may allocate a code where a segment of the total length includes the code and another segment is reserved for location information. A reserved segment may be set to a value (e.g., a well-known value, such as all zeros or all ones), for example, to indicate an allocation. A PF in other PLMNs may respond to the PF in the HPLMN and may provide the foregoing information. A PF in other PLMNs may provide a location exchange response.

At 1722, a PF in the HPLMN may respond to the WTRU with a discovery response, which may include an indication whether the WTRU is allowed to exchange location information. An indication may be per ProSe query code, may be an indication for all the ProSe query codes, etc. An indication may be explicit, e.g., in the form of a new information element that may be called location exchange response. An indication may be implicit in the ProSe query code, e.g., a code segment (e.g., the last 64 bits, or another well-known length or bit position) may have a value (e.g., a well-known value such as all zeros, all ones, or other pre-defined or pre-configured value) that may indicate the WTRU may exchange location information for the ProSe query code in question. A lack of a well-known value, a lack of an explicit indication (e.g., lack of location exchange response), a value of the location exchange response indicating that location information exchange is not allowed, etc., may be used to prevent an exchange of location information for the ProSe query code in question, for all ProSe query codes, etc. A response may indicate the type of location information to exchange (e.g., SUPL, GPS, or other) and/or other information for the location exchange response.

At 1724, a WTRU may verify a response received from the PF. A WTRU may, e.g., when a response indicates location exchange is permissible (e.g., per ProSe Query Code), exchange its location information when (e.g. every time) the WTRU sends a ProSe Query Code for which there is an associated indication to exchange location information (e.g., as received from the PF). A WTRU may use a received/indicated location type (e.g., GPS, SUPL, etc.) to compute and/or exchange location information. A WTRU may refresh its location information, for example, per indication received in a response message from the PF, from previous interaction with the PAS, etc.

Figure 18:
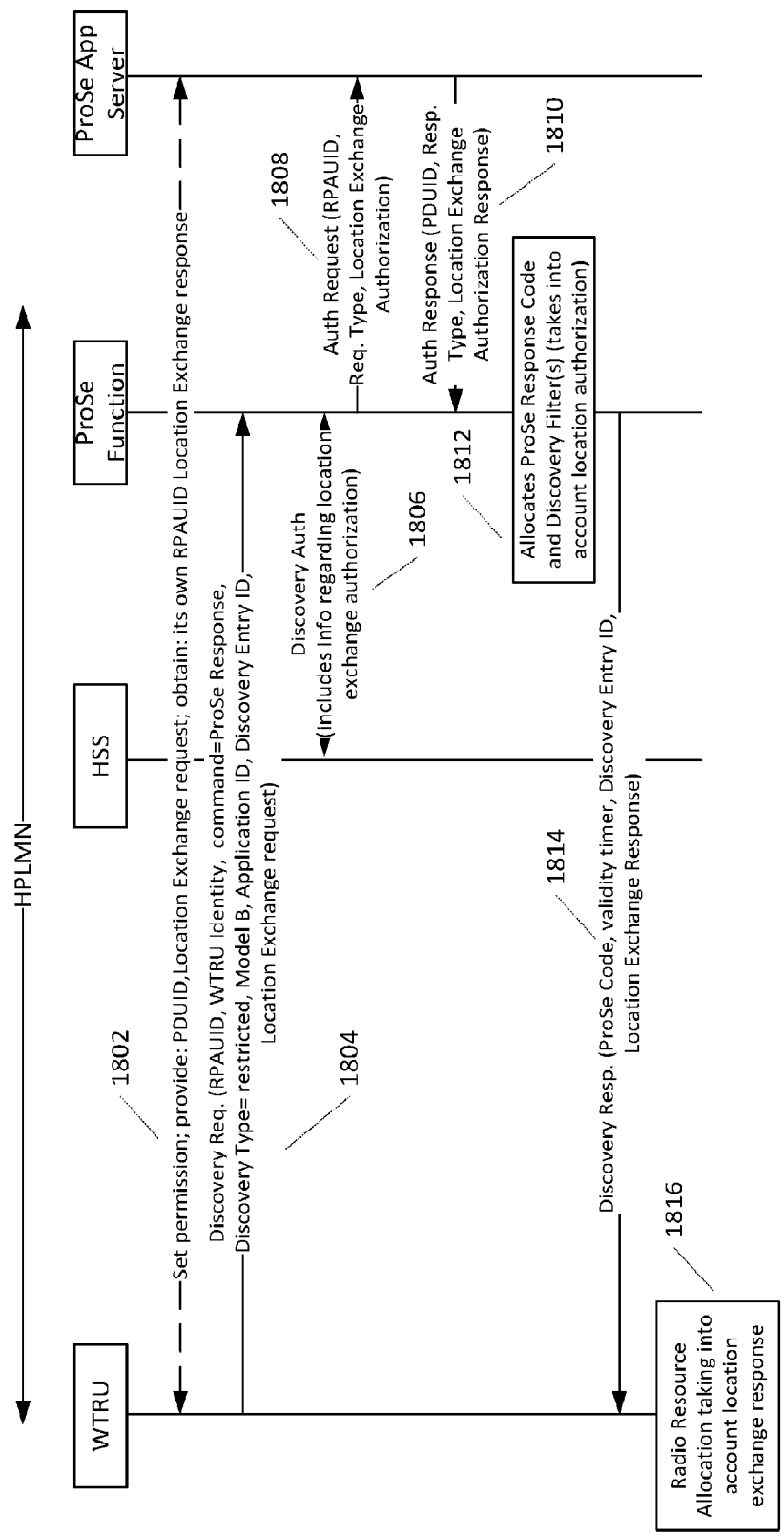
FIG. 18 is an interaction diagram illustrating an example of a discoveree location exchange procedure.

FIG. 18 is an interaction diagram illustrating an example of discoveree location exchange. Discoveree location exchange may be implemented, for example, in a non-roaming Model B discovery procedure. For a roaming scenario, the location indication or information may be sent to the VPLMN ProSe function as part of the VPLMN ProSe function authorization request procedure.

At 1802, a WTRU or user may set discovery preferences over an application layer (e.g., out of 3GPP scope). A WTRU may have a location exchange request in settings or application layer signaling, for example, as part of discovery preferences. Discovery preferences information may comprise an indication whether a WTRU should send/receive location information, e.g., for all peer users, per peer user identified by a peer application user identity, etc. A location exchange request may have information about a type of location information desired (e.g., SUPL, GPS, etc.), a computation type (e.g., precise/exact, estimate, relative distance, etc.). A PAS may inform a WTRU whether it is allowed to exchange location information and/or may provide other information for the contents of a location exchange request.

At 1804, a WTRU may include a location exchange request in a discovery message that it sends to the PF.

At 1806, an HSS may provide information about a WTRU regarding a location exchange, for example, when the WTRU is allowed to exchange location information, e.g., per application.

At 1808, a ProSe function may request authorization from a ProSe application server (PAS) for location exchange for a WTRU. A PAS may be requested to indicate whether a WTRU is allowed to do one or more things, e.g., transmit location information, receive location information, etc. A request may seek authorization for other information, such as a type of location information to be exchanged (e.g., SUPL, GPS, etc.), a precision of location information, etc.

At 1810, a PAS may inform a PF whether a WTRU is allowed to exchange location information and/or other information, such as a type of location information to be exchanged (e.g., SUPL, GPS, etc.), a precision of location information, etc. A PAS may account for an application layer decision, such as when a user is allowed to do so (or not), whether a user has requested to do so, whether the application needs location information, etc.

At 1812, a PF may allocate a set of ProSe Response Codes for a WTRU. The PF may account for an indication received from the PAS in the authorization response step. As an example, a PF, e.g., when authorized to exchange location information, may allocate a ProSe code where a segment of the total length may include the code and another segment may be reserved for location information. A reserved segment may be set to a value (e.g., a well-known value such as all zeros or all ones), for example, to indicate an allocation. A PF may allocate a code that uses the full length available for the code without reserving a segment for location information, for example, when the PAS indicates that the WTRU or user is not authorized to exchange location information.

At 1814, a PF in the HPLMN may responds to the WTRU with a discovery response, which may include an indication whether the WTRU is allowed to exchange location information. An indication may be per ProSe response code, may be an indication for all the ProSe response codes, etc. An indication may be explicit, e.g., in the form of a location exchange response information element. An indication may be implicit in the ProSe response code, e.g., a code segment (e.g., the last 64 bits, or another well-known length or bit position) may have a well-known value (e.g., all zeros, all ones, or other pre-defined or pre-configured value) that may indicate the WTRU may exchange location information for the ProSe response code in question. A lack of a well-known value, a lack of an explicit indication (e.g., lack of location exchange response), a value of the location exchange response indicating that location information exchange is not allowed, etc., may be used to prevent an exchange of location information for the ProSe response code in question, for all ProSe response codes, etc. A response may indicate the type of location information to exchange (e.g., SUPL, GPS, or other) and/or other information for the location exchange request.

At 1816, a WTRU may verify a response received from the PF. A WTRU may, e.g., when a response indicates location exchange is permissible (e.g., per ProSe query code), exchange its location information when (e.g., every time) the WTRU sends a ProSe query code for which there is an associated indication to exchange location information (e.g., as received from the PF). A WTRU may use a received/indicated location type (e.g., GPS, SUPL, etc.) to compute and/or exchange location information. A WTRU may refresh its location information, for example, per indication received in a response message from the PF, from previous interaction with the PAS, etc. A WTRU may compute its distance relative to another WTRU and may include this information as location information. A WTRU may receive a discovery message for Model B discovery. This message may include location information of a transmitting WTRU. A receiving WTRU (e.g., a discoveree WTRU) may compute its own location and may compute its relative distance from the transmitting WTRU (e.g., a discoverer WTRU or a discoveree WTRU). Location information may be a relative distance from received location information in a previous discovery message.

A PF may take into account local policies (e.g., per WTRU or per WTRU per application) and/or authorization information received from the HSS (e.g., per WTRU, per application, or per WTRU), for example, when deciding whether to indicate to a WTRU that location exchange is allowed and/or when allocating a ProSe query or response code.

Figures 19, 20:
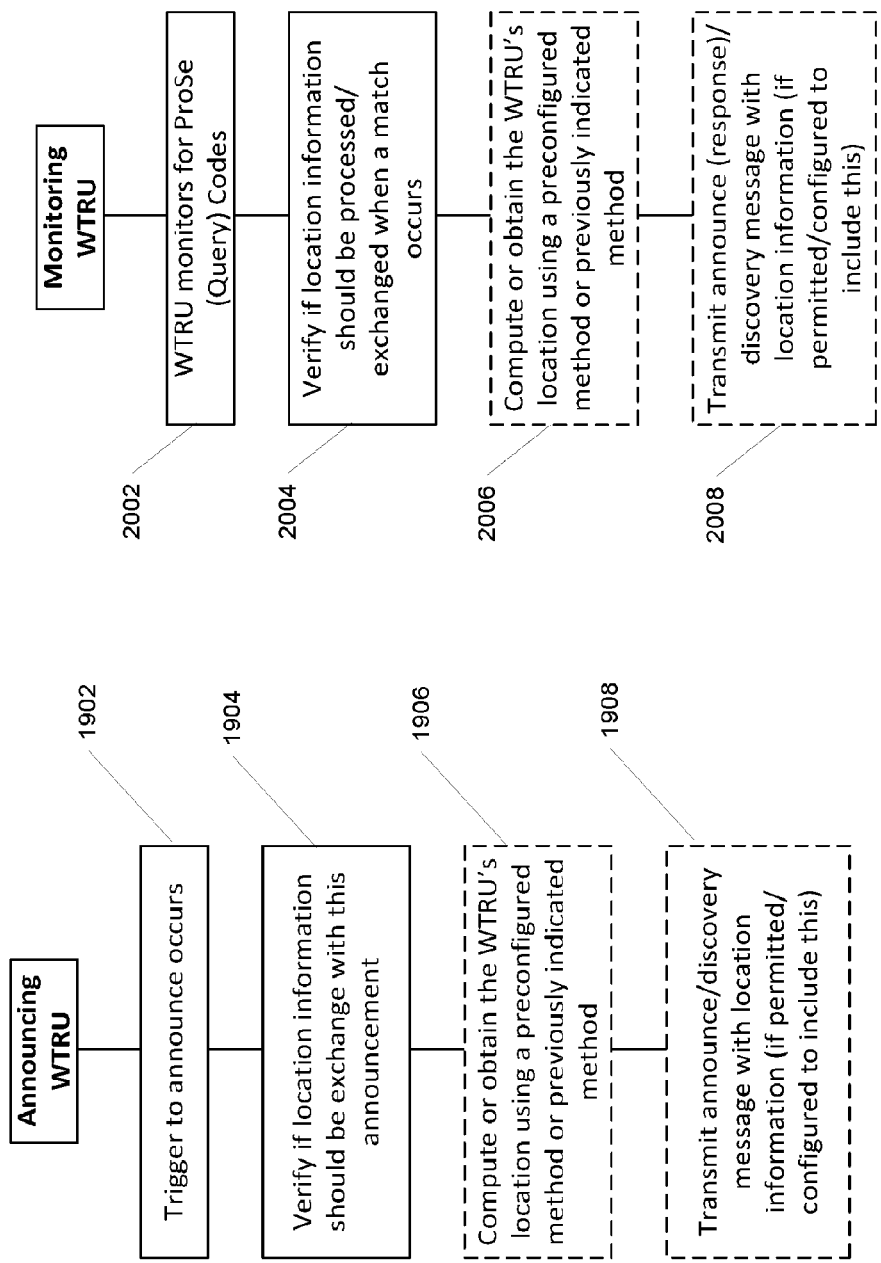
FIG. 19 is a flowchart of an example of discoverer behavior related to a discovery message.
FIG. 20 is a flowchart of an example of discoveree behavior related to a discovery message.

FIG. 19 is a flowchart of an example of discoverer behavior related to a discovery message. A discoverer or announcing WTRU may engage in location information exchange, for example, by sending an announcement discovery message (e.g. for Model A or Model B discovery), such as by sending a ProSe Code in general or a ProSe Query Code.

At 1902, a WTRU may have a trigger to send a discovery message, e.g., an announce request. A trigger and/or discovery request may emanate from, for example, an application client in the WTRU and/or user interaction.

At 1904, a WTRU may verify whether a discovery message to be sent should include location information. As an example, a WTRU (e.g., a ProSe layer in a WTRU) may verify whether a ProSe Code (e.g., Query Code) has a corresponding indication to include location information. An indication may be, for example, a separate indication or part of a previously received ProSe (e.g., Query) Code that may have a certain segment or field with a value (e.g., a well-known value).

At 1906, a WTRU may compute its location information, for example, using one or more techniques, which may be configured and/or indicated (e.g., a technique or techniques may be received from a PAS or a PF). A WTRU may have its location information computed.

At 1908, a WTRU may include retrieved and/or computed location information in a discovery message and may send it (e.g., wirelessly), for example, when a previous verification indicates that the WTRU is allowed to share location information, e.g., per application ID or per ProSe Code (e.g., Query Code).

FIG. 20 is a flowchart of an example of discoveree behavior related to a discovery message. A discoveree or monitoring WTRU may engage in location information exchange, for example, by receiving a discovery message (e.g., for Model A or Model B discovery) with location information or messaging related thereto.

At 2002, a WTRU may monitor for discovery messages or ProSe (e.g., Query) Codes. At 2004, a WTRU may, for example when a match occurs, verify whether received location information should be processed or whether a response from a WTRU should include location information in the discovery message to be sent. As an example, a WTRU (e.g., a ProSe layer in the WTRU) may verify whether the ProSe Code (e.g., Response Code) has a corresponding indication to include location information. The indication may be a separate indication or may be part of a previously received ProSe Code (e.g., Response Code) that may have a certain segment or field with a value (e.g., a well-known value). A WTRU may discard the received location information, for example, when the WTRU concludes that received location information should not be processed.

At 2006, a WTRU may compute its location information, for example, using one or more techniques, which may be configured and/or indicated (e.g., a technique or techniques may be received from a PAS or a PF). A WTRU may have its location information computed. A WTRU may compute a relative distance from the received location information.

At 2008, a WTRU may include retrieved and/or computed location information in a discovery message and may send it (e.g., wirelessly), for example, when a previous verification indicates that the WTRU is allowed to share location information, e.g., per application ID or per ProSe Code (e.g., Response Code).

A monitoring WTRU or discoverer WTRU may receive a ProSe application code with location information. A ProSe Protocol or a ProSe layer in the monitoring WTRU/discoverer WTRU may confirm with the ProSe function whether location information or proximity estimation should be passed on to the application corresponding to the ProSe restricted application layer user ID.

A monitoring WTRU or discoverer WTRU may include a location indication in a match report request message. A location indication may, for example, be in the form of actual raw location information received over the PC5 reference point by an announcing WTRU or discoveree WTRU or in the form of a flag suggesting that the WTRU has received location information from the announcing WTRU or discoverer WTRU. The ProSe function may confirm with the ProSe application server (PAS), for example, by sending the location indication as part of the authorization procedure over the PC2 interface. The location reporting to the application layer may be authorized by the PAS. Successful authorization information may be passed on to the WTRU in a Match Report Ack message. The ProSe layer or ProSe protocol in the WTRU may pass on the location information or proximity estimation to the application in the WTRU corresponding to the ProSe restricted application layer user ID.

Figure 21:
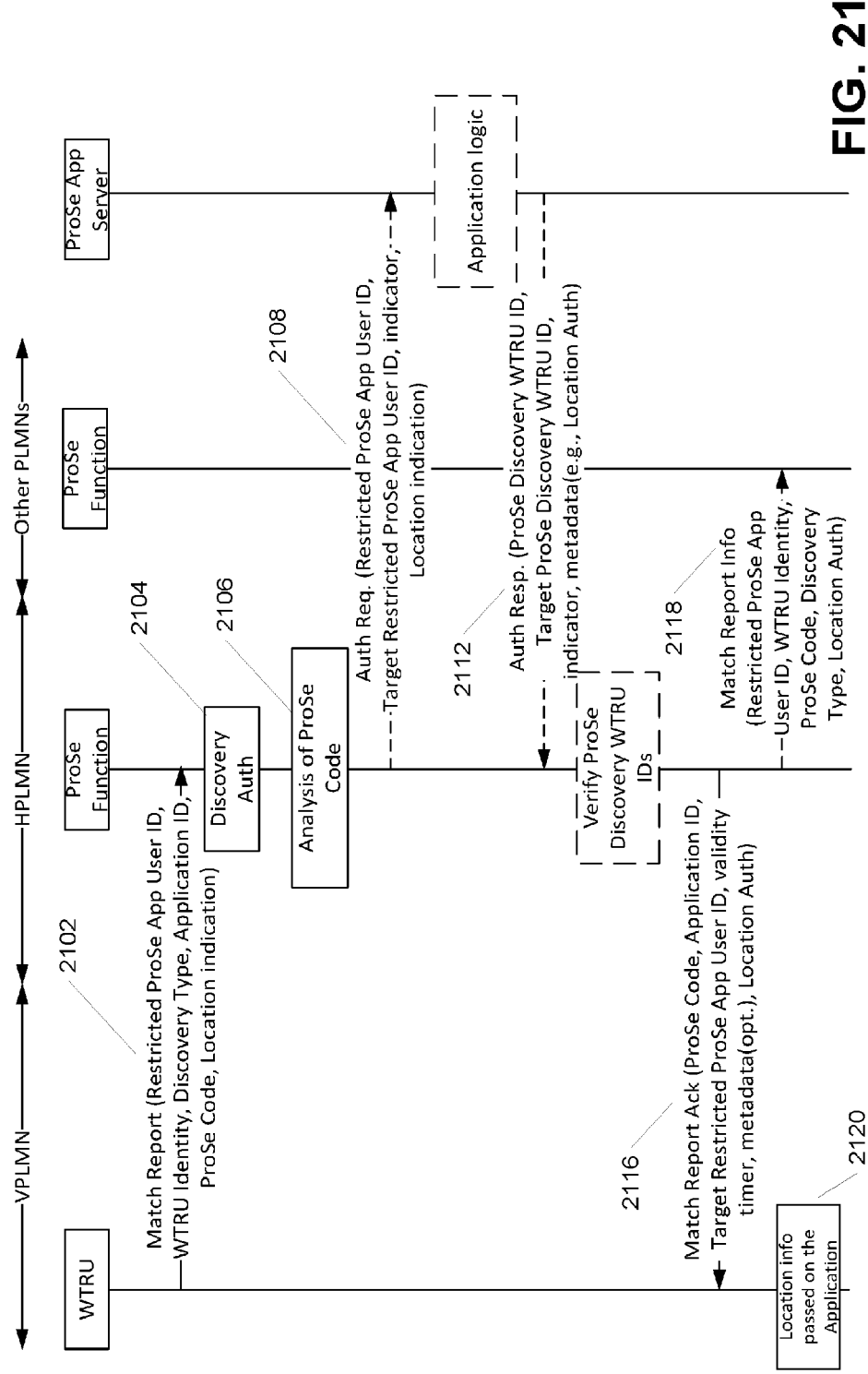
FIG. 21 is an interaction diagram illustrating an example of a match report procedure.

FIG. 21 is an interaction diagram illustrating an example of a match report procedure. At 2102, a WTRU may include a location indication in a match report that it sends to the ProSe function. A location indication may be received location information or an indication that location information has been received.

Location authorization may be requested by the monitoring in the discovery request procedure. For example, a ProSe function of the monitoring WTRU may receive the authorization over PC2 interface and may send it to the monitoring WTRU in the discovery response message. If the monitoring WTRU is authorized, it may include the location information in the match report as described in FIG. 21, If the monitoring WTRU is not authorized, the monitoring WTRU may discard the location information received on a broadcast using the PC5 reference.

At 2104 and 2106, a ProSe function may perform discovery authorization and analysis of ProSe code, for example, in response to receiving a match report.

At 2108, a ProSe function may request authorization from the ProSe application server (PAS) for location information to be passed on to the application in the WTRU. The authorization request may ask the PAS to indicate whether the application is authorized to receive location or proximity estimation information.

At 2112, the ProSe application server may inform the ProSe function whether the application is allowed to receive location information. The ProSe application server may take into account whether the application layer has made or should make the decision, e.g., whether the user is allowed to receive location information, whether the user has requested to receive location information, and/or whether the application needs location information, etc.

At 2116, a ProSe function in the HPLMN may respond to the WTRU with a match report ACK message, which may include an indication whether the ProSe layer is allowed to send the location information to the application corresponding to the ProSe restricted user application ID.

At 2118, location authorization information may be sent to the ProSe function of the other PLMN.

At 2120, a ProSe layer in the WTRU may pass the location information to the corresponding Application in the WTRU.

Systems, methods, and instrumentalities have been disclosed for enabling exchange of location and other status information between Proximity Service (ProSe) users. A ProSe function may retrieve a ProSe WTRU's location data from SLP and provide it to a monitoring WTRU via a ProSe discovery procedure or EPC-level ProSe discovery procedure. A ProSe function may retrieve a ProSe WTRU's location data from a ProSe WTRU and provide it to monitoring WTRUs via a ProSe discovery procedure. A ProSe WTRU may broadcast its location and/or other status information in a discovery message. A ProSe function may encrypt the location and/or other status information for encryption before broadcast. A ProSe WTRU may send its location and/or other status information via a user plane to another ProSe WTRU or ProSe group. A ProSe function may verify whether a WTRU is permitted to disclose and/or process information (e.g., location information) and may indicate to a WTRU whether to disclose information, e.g., before the information is disclosed, and/or whether to process the information.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A method for communicating status information, the method comprising:

receiving a match report from a first wireless transmit/receive unit (WTRU) at a proximity service (ProSe) function, the match report comprising an indication that location information was received, the location information being associated with a second WTRU;

determining whether the first WTRU is authorized to use the location information associated with the second WTRU; and if the first WTRU is authorized to use the location information associated with the second WTRU, sending a match report acknowledgement to the first WTRU, the match report acknowledgement comprising location authorization information associated with the second WTRU, the location authorization information permitting the first WTRU to pass the location information associated with the second WTRU to an application in the first WTRU.

2. The method of claim 1, further comprising receiving the location information from a secure user plane location (SUPL) location platform (SLP).

3. The method of claim 1, further comprising using an evolved packet core (EPC) level ProSe discovery procedure to obtain the location information associated with the second WTRU.

4. The method of claim 1, wherein the location information is sent to the first WTRU in a discovery message.

5. The method of claim 1, wherein the location information is encrypted.

6. The method of claim 1, further comprising determining whether the first WTRU is authorized to use the location information associated with the second WTRU based on a home subscriber server (HSS) subscription.

7. The method of claim 1, further comprising requesting authorization from a ProSe application server (PAS) for the location information to be used by the first WTRU.

8. A public land mobile network (PLMN) device comprising:

a memory to store processor-executable instructions; and a processor to execute the processor-executable instructions to:

receive a match report from a first wireless transmit/receive unit (WTRU) at a proximity service (ProSe) function, the match report comprising an indication that location information was received, the location information being associated with a second WTRU;

determine whether the first WTRU is authorized to use the location information associated with the second WTRU; and if the first WTRU is authorized to use the location information associated with the second WTRU, send a match report acknowledgement to the first WTRU, the match report acknowledgement comprising location authorization information associated with the second WTRU, the location authorization information permitting the first WTRU to pass the location information associated with the second WTRU to an application in the first WTRU.

9. The PLMN device of claim 8, wherein the processor is configured to receive the location information from a secure user plane location (SUPL) location platform (SLP).

10. The PLMN device of claim 8, wherein the processor is configured to use an evolved packet core (EPC) level ProSe discovery procedure to obtain the location information.

11. The PLMN device of claim 8, wherein the location information is sent to the first WTRU in a discovery message or using a PC5 reference point.

12. The PLMN device of claim 8, wherein the location information is encrypted.

13. The PLMN device of claim 8, wherein the processor is configured to determine whether the first WTRU is authorized to use the location information based on a home subscriber server (HSS) subscription.

14. The PLMN device of claim 11, wherein the processor is configured to request authorization from a ProSe application server (PAS) for the location information to be used by the first WTRU.

15. A first wireless transmit/receive unit (WTRU) comprising:

a processor configured to:

send a match report to a proximity service (ProSe) function, the match report comprising an indication that location information has been received, the location information being associated with a second WTRU;

receive a match report acknowledgement comprising location authorization information associated with the second WTRU on a condition that the second WTRU is authorized to disclose the location information to the first WTRU; and allow an application in the first WTRU to access the location information associated with the second WTRU based on receiving the location authorization information in the match report acknowledgement.

16. The first WTRU of claim 15, wherein the processor is configured to use an evolved packet core (EPC) level discovery procedure to obtain the location information.

17. The first WTRU of claim 15, wherein the processor is configured to receive the location information from a secure user plane location (SUPL) location platform.

18. The first WTRU of claim 15, wherein the location information is received by the first WTRU in a discovery message.

19. The first WTRU of claim 15, wherein the location information is received by the first WTRU using a PC5 reference point.

20. The first WTRU of claim 15, wherein the location information is encrypted.

* * * * *

UNITED STATES PATENT AND TRADEMARK OFFICE
CERTIFICATE OF CORRECTION

PATENT NO. : 10,534,932 B2
APPLICATION NO. : 15/516337
DATED : January 14, 2020
INVENTOR(S) : Wang et al.

It is certified that error appears in the above-identified patent and that said Letters Patent is hereby corrected as shown below:

In the Claims

Column 30, Line 21 Claim 14: replace "claim 11" with --claim 8--

Signed and Sealed this
Twenty-fourth Day of March, 2020

Andrei Iancu
*Director of the United States Patent and Trademark Office*